United States Patent
Barkas et al.

(10) Patent No.: US 11,416,924 B2
(45) Date of Patent: Aug. 16, 2022

(54) BILL PRESENTMENT BASED ON A USER LEARNING STYLE

(71) Applicant: Wells Fargo Bank, N.A., San Francisco, CA (US)

(72) Inventors: Sotirios K. Barkas, San Jose, CA (US); Yon W. Lee, San Francisco, CA (US); Darius A. Miranda, San Francisco, CA (US); Marria Rhodriquez, San Francisco, CA (US); Darrell L. Suen, San Ramon, CA (US); John Wright, Benicia, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 561 days.

(21) Appl. No.: 15/870,662

(22) Filed: Jan. 12, 2018

(65) Prior Publication Data

US 2019/0220922 A1    Jul. 18, 2019

(51) Int. Cl.
```
G06Q 40/02      (2012.01)
G06F 40/106     (2020.01)
G06F 40/186     (2020.01)
G06Q 40/00      (2012.01)
G06F 16/30      (2019.01)
```

(52) U.S. Cl.
CPC ............ *G06Q 40/02* (2013.01); *G06F 16/30* (2019.01); *G06F 40/106* (2020.01); *G06F 40/186* (2020.01); *G06Q 40/12* (2013.12)

(58) Field of Classification Search
USPC ........................................................ 705/35
See application file for complete search history.

(56) References Cited

U.S. PATENT DOCUMENTS

| | | |
|---|---|---|
| 2011/0010612 A1* | 1/2011 | Thorpe ................. G06F 16/957 718/100 |
| 2011/0276493 A1 | 11/2011 | Graham et al. |
| 2012/0123924 A1 | 5/2012 | Rose et al. |
| 2013/0212487 A1* | 8/2013 | Cote ................. H04N 21/41407 715/745 |
| 2018/0032980 A1* | 2/2018 | Rodriguez ........... G06Q 20/102 |

* cited by examiner

*Primary Examiner* — Ambreen A. Alladin
(74) *Attorney, Agent, or Firm* — Foley & Lardner LLP

(57) ABSTRACT

Examples described herein relate to apparatuses and methods of determining an optimal viewing layout of a content item on a computing device based on user preference data. The method includes receiving a request for a content item associated with an account of a user. The method includes selecting a template having a set of elements for generating a content item. The method includes selecting a content item dataset associated with the content item. The method includes generating layout data based on the content item dataset and the selected template. The method includes sending the layout data, causing operations comprising assembling the content item for display in an application based on the layout data, and gathering user preference data in response to an interaction of the user with the displayed content item. The method includes updating the template based on the user preference data.

17 Claims, 9 Drawing Sheets

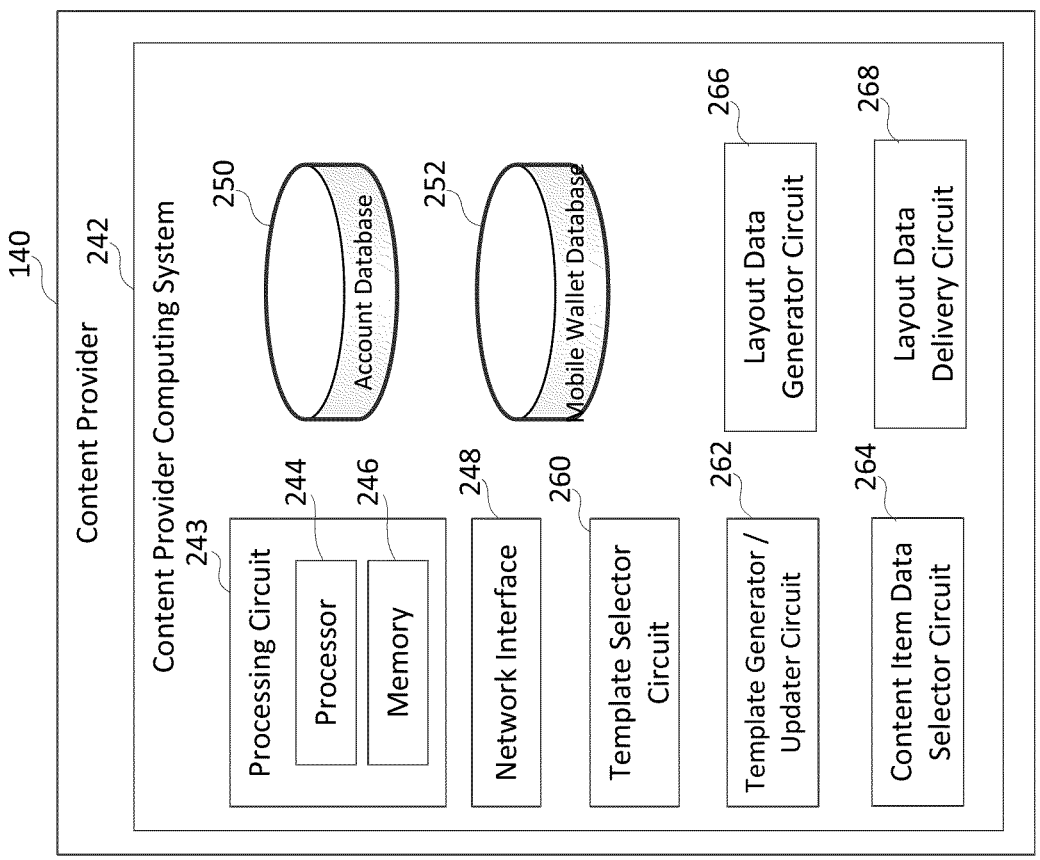
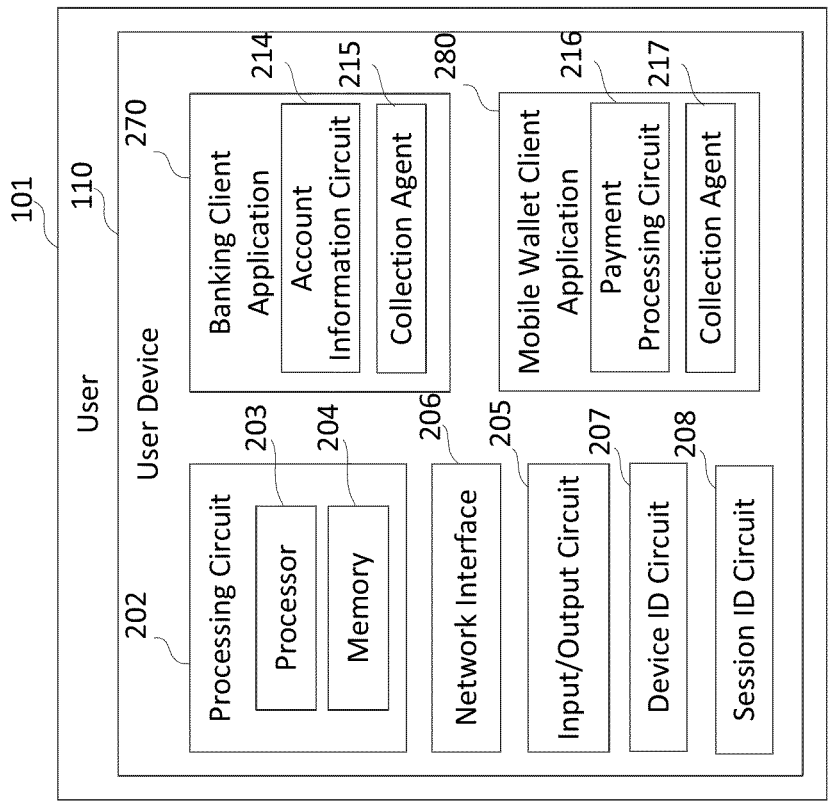
Fig. 2B
Fig. 2A

300a

Content Provider - Banking & More http://www.content-provider140.com — 304a

Select account [xxxx-2788 ▼]  Time Period [2-week ▼]  [Request PDF]
— 306a — 308a — 310a

| Date | Description | Deposit/Credit | Withdrawal/Debts |
|---|---|---|---|
| 11/30/2017 | Gas & Electric | | 485.32 |
| 11/29/2017 | Mortgage | | 3,040.50 |
| 11/26/2017 | Paycheck | 7,050.94 | |
| 11/26/2017 | Supermarket | | 345.77 |
| 11/23/2017 | Tax | 9,385.39 | |
| 11/21/2017 | Life Insurance | | 125.00 |
| 11/20/2017 | WF Theatre | | 38.84 |
| 11/20/2017 | Coastal Clothing | | 274.55 |
| 11/20/2017 | E-card | | 1,301.43 |
| 11/20/2017 | Computer Store | | 2,304.35 |
| 11/22/2017 | Dentist | | 654.04 |
| 11/16/2017 | Airplane Ticket | | 841.20 |
| Totals | | 16,436.33 | 5,611.41 |

309a (left bracket of table)  314a

Bill Payment Options — 330a

[Pay Now] 🛒 [Dispute Transactions]
— 332a — 336a — 334a

— 316a

Browser Settings — 318a

Font Size [12pt ▼] — 320a    Font Type [Arial ▼] — 324a
Zoom [100% ▼] — 322a    Orientation [Portrait ▼] — 326a

Content Provider - Banking & More http://www.content-provider140.com  — 304b

| Select account | xxxx-2788 ▼ | Time Period | 1-month ▼ | Request PDF |
|---|---|---|---|---|

— 306b  — 308b  — 310b

| Description | Deposit/Credit | Withdrawal/Debts | Category |
|---|---|---|---|
| Gas & Electric | | 485.32 | Utility |
| Mortgage | | 3,040.50 | Monthly |
| Paycheck | 7,050.94 | | Direct Deposit |
| Supermarket | | 345.77 | Food |
| IRS Payment | 9,385.39 | | Tax |
| Life Insurance | | 125.00 | Insurance |
| WF Theatre | | 38.84 | Entertainment |
| Coastal Clothing | | 274.55 | Textile |
| E-card | | 1,301.43 | Credit Card |
| Computer Store | | 2,304.35 | Electronics |
| Dentist | | 654.04 | Medical |
| Airplane Ticket | | 841.20 | Travel |
| Roof | | 985.42 | Repair |
| School Tuition | | 1300.54 | Education |
| Totals | 16,436.33 | 6,897.37 | |

309b  314b

Bill Payment Options — 330b

[Pay Now] 332b    336b    [Dispute Transactions] 334b

316b

Browser Settings — 318b

| Font Size | 16pt ▼ | — 320b | Font Type | Arial ▼ | — 324b |
| Zoom | 100% ▼ | — 322b | Orientation | Portrait ▼ | — 326b |

FIG. 3B

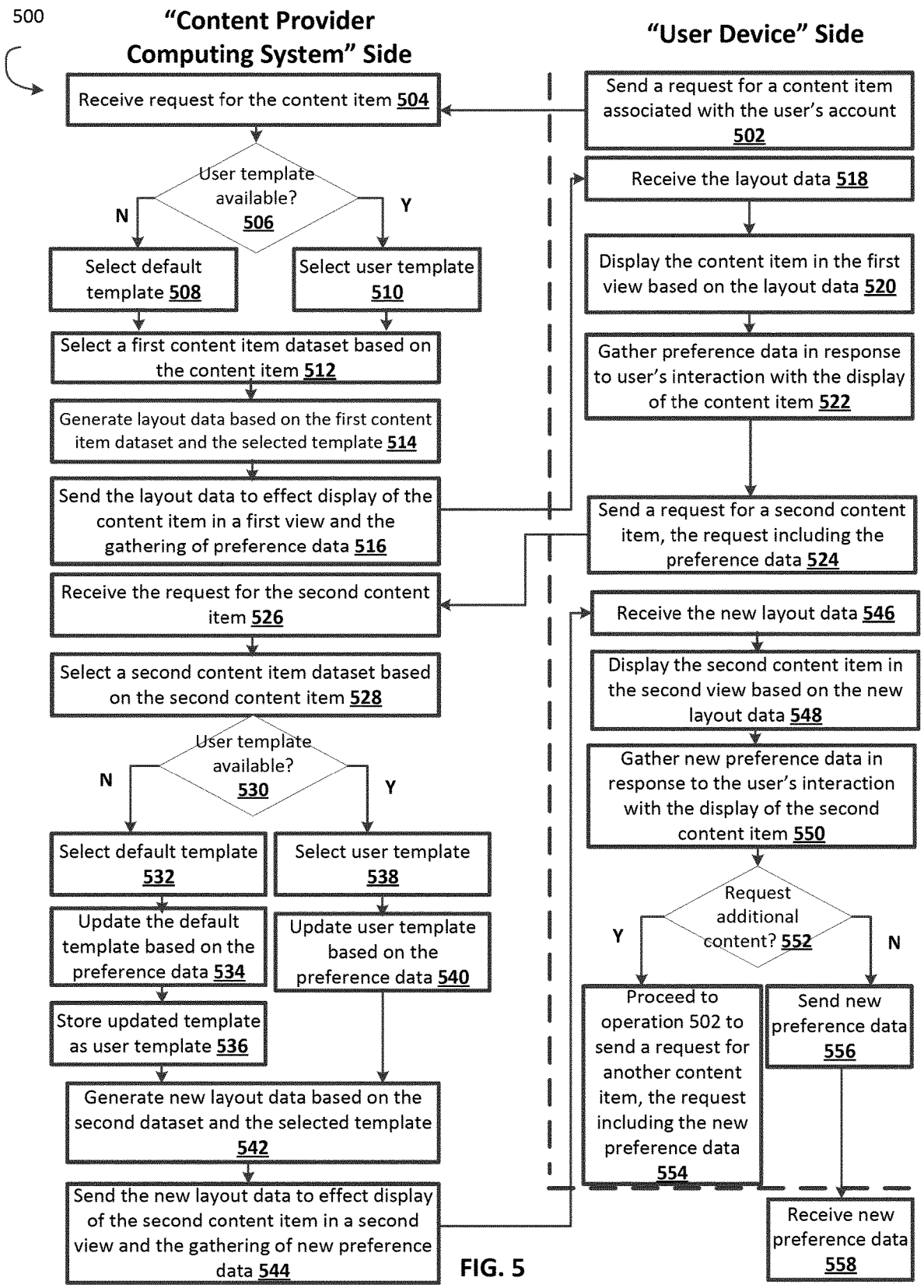

700

BILL PRESENTMENT BASED ON A USER LEARNING STYLE

BACKGROUND

Many merchants rely on some form of Electronic Bill Presentment and Payment (EBPP) system to create and deliver invoices and billing statements to their customers in order to provide their customers with a convenient online option to pay their bills over the internet. In contrast to the traditional paper-based solutions, EBPP systems provide customers the ability to manage their bills without having to visit their local bank to transfer funds or the post office to send their payment by mail.

SUMMARY

Aspects of the present disclosure relate generally to a content item delivery system, and more particularly to systems and methods for determining an optimal viewing layout of a content item on a computing device based on user preference data.

One implementation disclosed herein is directed to a method of determining an optimal viewing layout of a content item on a computing device based on user preference data. The method includes receiving, by a content provider computing system and from a user device, a request for a content item associated with an account of a user. In some arrangements, the method includes, selecting, by the content provider computing system, a template having a set of elements for generating a content item. In some arrangements, the method includes selecting, by the content provider computing system and for the set of elements, a content item dataset associated with the content item. In some arrangements, the method includes generating, by the content provider computing system, layout data based on the content item dataset and the selected template. In some arrangements, the method includes sending, by the content provider computing system and to the user device, the layout data. In some arrangements, the layout data causing operations comprising assembling, by the user device, the content item for display in an application based on the layout data. In some arrangements, the method includes updating, by the content provider computing system, the template based on the user preference data.

In another aspect, the present disclosure is directed to a system for determining an optimal viewing layout of a content item on a computing device based on user preference data. In some arrangements, the system includes a content provider computing system configured to receive, from a user device, a request for a content item associated with an account of a user. In some arrangements, the system includes a content provider computing system configured to select, from a template storage, a template having a set of elements for generating a content item. In some arrangements, the system includes a content provider computing system configured to select, for the set of elements, a content item dataset associated with the content item. In some arrangements, the system includes a content provider computing system configured to generate layout data based on the content item dataset and the selected template. In some arrangements, the system includes a content provider computing system configured to send, to the user device, the layout data causes the user device to assemble the content item for display in an application based on the layout data. In some arrangements, the system includes a content provider computing system configured to update the template based on user preference data.

One implementation disclosed herein is directed to a non-transitory computer readable storage medium to store a computer program configured to execute a method for determining an optimal viewing layout of a content item on a computing device based on user preference data. The method includes receiving, by a content provider computing system and from a user device, a request for a content item associated with an account of a user. In some arrangements, the method includes, selecting, by the content provider computing system, a template having a set of elements for generating a content item. In some arrangements, the method includes selecting, by the content provider computing system and for the set of elements, a content item dataset associated with the content item. In some arrangements, the method includes generating, by the content provider computing system, layout data based on the content item dataset and the selected template. In some arrangements, the method includes sending, by the content provider computing system and to the user device, the layout data. In some arrangements, the layout data causing operations comprising assembling, by the user device, the content item for display in an application based on the layout data. In some arrangements, the method includes updating, by the content provider computing system, the template based on the user preference data.

These and other features, together with the organization and manner of operation thereof, will become apparent from the following detailed description when taken in conjunction with the accompanying drawings.

BRIEF DESCRIPTION OF THE FIGURES

FIG. 2A is a block diagram depicting an example user device of the environment in FIG. 1, according to some arrangements.

FIG. 2B is a block diagram depicting an example content provider of the environment in FIG. 1, according to some arrangements.

FIG. 3A is a block diagram depicting an example browser displaying a default viewing layout of a content item, according to some arrangements.

FIG. 3B is a block diagram depicting an example browser displaying a user-preferred viewing layout of a content item, according to some arrangements.

FIG. 5 is a flow diagram depicting a method for determining an optimal viewing layout of a content item on a computing device based on user preference data, according to some arrangements.

Like reference numbers and designations in the various drawings indicate like elements.

DETAILED DESCRIPTION

An increasing number of merchants are implementing EBPP systems to offer their customers the choice to view and pay their bills online. However, the functional limitations of these conventional EBPP systems prevent customers from fully experiencing an online bill/statement viewing and payment system that is tailored to their individual needs. For example, EBPP systems tend to deliver all documents to their customers in only a select number of formats, as determined by the EBPP system administrator. Yet, not all customers are alike—some may have visual and/or learning limitations making it difficult to read and comprehend the bill/statement in its current format. Others may just prefer to see their documents in a specific format and layout. Regardless of the reasons for their preference differences, these customers generally become frustrated each time they have to adjust their online expectations to the single viewing format dictated by the EBPP system. Furthermore, even if these systems provide the customer with the controls to alter the formatting of their bill, such as changing the font size or the page orientation, these changes only apply to the current bill and not to future bills. That is, the customer has to repeat their manual formatting changes each time they request a bill from the system because EBPP systems do not learn and adjust to the customer's viewing preference. Consequently, conventional EBPP systems require customers to spend more time formatting and viewing their bill online, further consuming more networking resources and burdening an already congested network.

Accordingly, the present disclosure is directed to systems and methods for automatically learning an optimal viewing layout of one or more electronic content items on a computing device (e.g., on an electronic display) based on the user's preference data, providing each customer with a uniquely, consistent online experience tailored to their needs and one that radically reduces network congestion.

The present system and methods also describes a seamless bill payment/dispute option that also saves customers considerable time and effort in managing the online payment of their bills. In such implementations, the system provides customers who view their bills online with an opportunity to drag transactions shown on their online bill into a transaction bin. The customer can then simply select the pay-now button to pay the transaction or select the dispute transaction button to dispute the transaction.

Figure 1:
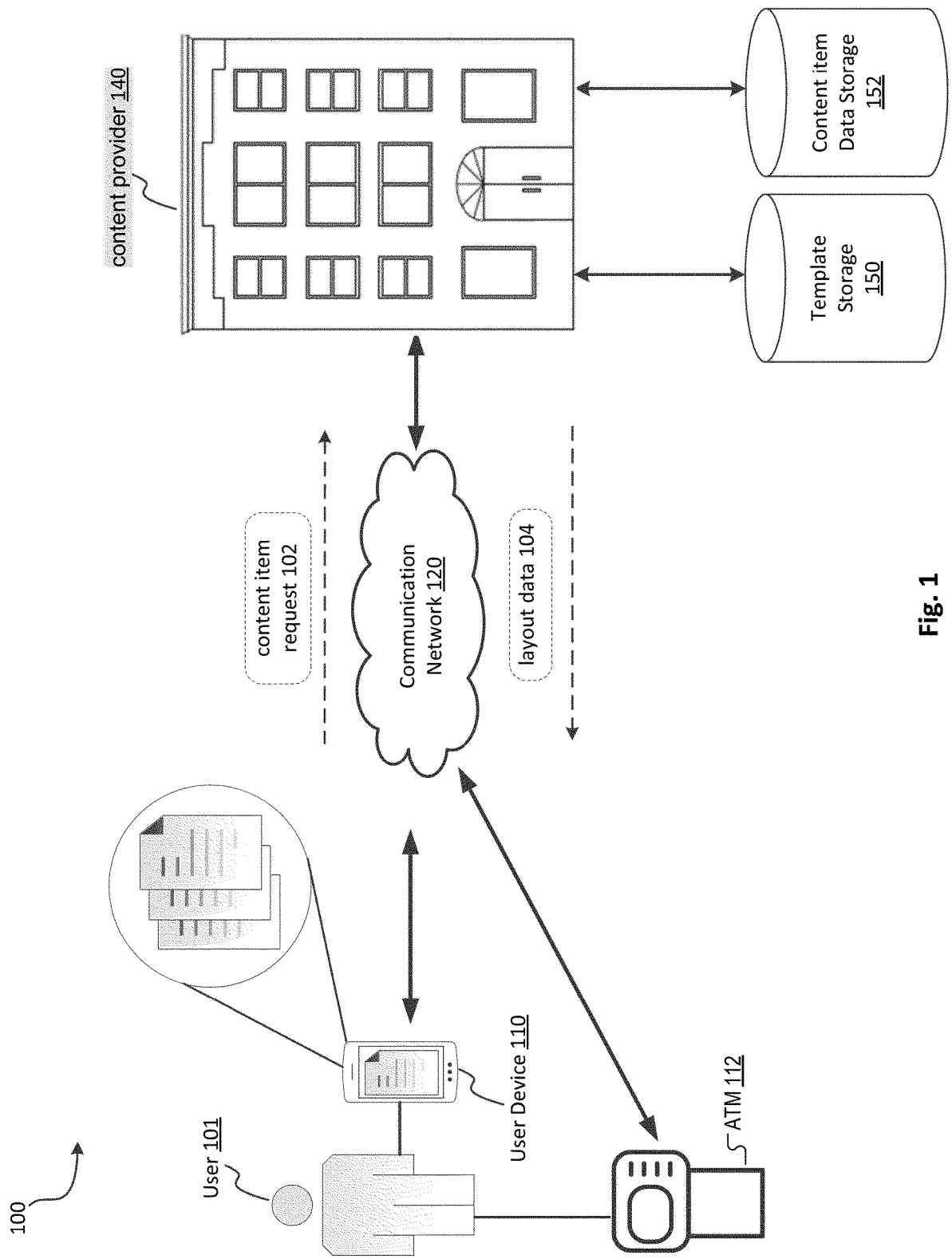
FIG. 1 is a block diagram depicting an example environment for determining an optimal viewing layout of a content item on a computing device based on user preference data, according to some arrangements.

FIG. 1 is a block diagram depicting an example environment 100 for determining an optimal viewing layout of a content item on a computing device based on user preference data, according to some arrangements. The environment 100 includes a content provider 140 (associated with a content provider computing system 242 of FIG. 2B) for delivering layout data (e.g., layout data 104) of a content item associated with the marketing and/or transaction of products and/or services to a user (e.g., user 101) of a computing device, such as user device 110. The environment 100 includes an automatic teller machine (shown as ATM 112) for conducting transactions and acquiring user preference data from user 101. The user 101 may be a current customer of content provider 140 or a potential customer of content provider 140 who wishes to enter into a potential transaction with content provider 140. In some arrangements, user 101 may be an individual or an entity (e.g., a company, a corporation, a partnership, a Trust, an Association, or the like). The environment 100 includes a communication network 120 that connects user device 110 and ATM 112 to one or more computing systems (e.g., content provider computing system 242 in FIG. 2A) associated with and/or controlled by content provider 140. The environment 100 may include many thousands of user devices 110, ATMs 112, and content providers 140, each interconnected via communication network 120. In some arrangements, environment 100 may include subsets of content providers 140 where each content provider 140 within a subset are interconnected to one another via communication network 120 but communicatively unavailable (e.g., disconnected, isolated, fire-walled) to content providers 140 of another subset. As such, each content provider 140 within a subset may share some or all of its stored data that is specific to user devices 110 connected to that subset, such as user preference data, user device identifiers, session identifiers, layout data (e.g., layout data 104), and transaction history. While content provider 140 is depicted in as brick and mortar locations in FIG. 1, one of ordinary skill in the art could appreciate that one or more of the content providers 140 may not be associated with brick and mortar locations.

The environment 100 includes a template storage 150 for storing templates received or generated by one or more computing systems (e.g., content provider computing system 242 in FIG. 2A) of content provider 140. The environment 100 includes a content item data storage 152 for storing data (e.g., content item data, user preference data, user device identifiers, session identifiers, layout data, customer information, account information, transaction history, content items, etc.) associated with one or more users (e.g., user 101) having a business relationship with content provider 140. The content item data storage 152 may collect and store content item data associated with users (e.g., user 101) in the course of dealing (e.g., processing transactions, offering products and/or services, and the like) with each of the users. While a single content provider 140 and content item data storage 152 are shown for illustrative purposes, one of ordinary skill in the art can appreciate that the entirety of the content item data of the user 101 can be spread across and stored with one or more content providers and data storages/databases.

The one or more templates stored in the template storage 150 may be retrieved responsive to a request for one or more templates from content provider computing system (specifically, template generator/updater circuit 262 in FIG. 2B). A template describes the layout and appearance (e.g., font size, font color, screen resolution, zoom, scroll rate, x-y coordinates indicating placement on the screen, portrait/landscape, etc.) of a content item as it is presented on a display screen. In particular, a template defines the elements, the arrangement of the elements, and the attributes assigned to each element for a content item to be generated from the template. In some arrangements, the one or more templates may be a constrained XML, configuration file that defines one or more elements of the template. An element (or graphical control element) of a template may be any feature, component, or widget including e.g., a drop-down menu/box, a list box, a text label, button, radio button, check box, container, window, panel, frame, scroll bar, mouse/text cursor, combo-box, textbox, text field, entry field, search box, or any other widget from a toolkit that controls the display of content on a display screen. Each template may include one or more attributes associated with (or assigned to) each element of the template. For example, a first text box (a first "element") of the template may be assigned three attributes (e.g., x-y coordinates of {200, 45}, 12-point font size, and bold font) and a second text box (a second "element") of the template may be associated with four attributes (e.g., x-y coordinates of {430, 145}, 16-point font size, italic font, large caps).

Example attributes of an element include, e.g., element name (e.g., "button 1"), element value (e.g., "John Doe's Bill Summary" inserted into a text field element reserved for a title of a webpage), font size, font color, font effects (e.g., strikethrough, superscript, subscript, shadow, outline, emboss, engrave, small caps, large caps), font style (e.g., regular, italic, bold, underline), font type/theme (e.g., Times New Roman, Ariel, etc.), screen zoom, screen resolution, page layout, arrangement of rows and columns of content displayed in tabular format, arrangement of transactions on an interactive map, expanded mode of text and/or image, compressed mode of text and/or image, sorting of transactions/transaction history (e.g., chronological, alphabetical, largest/smallest monetary value), appearance of content displayed in a graphical format, horizontal/vertical scroll bar positioning/speed, application window size, viewing angle/mode, page layout (e.g., portrait, landscape, whole page mode, map mode), depth of field (DOF), focus range/effective focus range, screen width/height, or any other attributes that describe the visual display of a content item as described herein or one that a person of ordinary of skilled art could appreciate as an attribute. The attributes associated with a template may be stored within the template (e.g., metadata, HTML tags) or in a separate file (metafile) such as a script (e.g., C, C++, C#, Java, JavaScript, VBScript, Perl, HTML, XML, Python, TCL, and Basic). In some arrangements, a template may include dynamic links to scripts that initialize/modify the attributes for the elements in that template. In some implementations, content provider computing system 242 (e.g., layout data generator circuit 266 in FIG. 2B) generates a template as executable code that one or more processors of a computing device (e.g., content provider computing system 242, user device 110) may execute.

The template and its associated attributes define the overall appearance of a displayed content item by initializing and/or modifying the features of any software applications executed by user device 110 (e.g., user device's 110 operating system, banking client application 270, mobile wallet client application 280, an email reader/client, etc.) and/or hardware features associated with (or controlled by) user device 110 (e.g., a graphic user interface (GUI), keyboard lights, display screen refresh rate, contrast, speaker volume, audio narration mode, video playback mode, video playback speed, etc.), that facilitate the presentation/display (or audio narration) of the content item. As discussed below, template generator/updater circuit 262 of FIG. 2B modifies "element attributes" of a template with user preference data, and layout data generator circuit 266 assigns/maps the "element value" component associated with each element in the template with content extracted from content item data. In some arrangements, template generator/updater circuit 262 may modify any attribute of a template with content item data.

As used herein, content item data (also referred to as "content item information") associated with user 101 includes information about assets, liabilities, and transaction activities of the user 101. Examples of types of content item data include, but are not limited to, account types (e.g., saving, credit, checking, investment, retirement, brokerage, mortgage, rewards, and the like), account balances, account activities, invoices, transaction history (including potential transactions), auto-pay preferences, income, debt, saving, mortgage, and the like. Given that user 101 may hold accounts at more than one content provider, the content item data of the user 101 may be stored in two or more databases (e.g., content item data storage 152) managed by two or more content providers (e.g., content providers 140). In some arrangements, a content item includes all or a portion of the content item data available for a particular user. In some arrangements, a content item may present content item data to a user via a variety of formats, including e.g., as a document, as text, as one or more images, as audio/speech/acoustic, as one or more videos, etc.

In some arrangements, the user 101 is an account holder of at least one account at the content provider 140 (e.g., a commercial company/bank, an investment company/bank, a management investment company, a non-bank institution (e.g., savings and loans, credit union, shadow bank), a brokerage house, an insurance company, a medical provider, a charitable organization, etc.). The content provider 140 may facilitate various types of transactions between the user 101 and other parties. The user 101 is associated with (e.g., uses) the user device 110 for transactions, including the potential transaction. That is, the user 101 operates the user device 110 to access products and/or services provided by the content provider 140. According to a non-limiting example, the user 101 can use a mobile wallet or online payment features provided by the content provider 140 to pay for the goods or services offered by other parties. The mobile wallet or online payment features are provided through software applications on the user device 110. In some arrangements, the user 101 is a user of a computing device with a prior or current connection to a content provider computing system (e.g., content provider computing system 242 in FIG. 2B) of the content provider 140.

A potential transaction is a possible transaction digitally initiated and not yet completed. For example, the potential transaction is at a stage in which the user 101 has identified, through a user interface (e.g., internet browser) of a user device 110, the content provider 140 as the other party to the potential transaction. Before a transaction indicator is received by the user device 110, the potential transaction is not completed (e.g., payment from the user 101 has not yet been made to another party). The potential transaction is not an investment in some examples. In other examples, the potential transaction can be an investment.

The user device 110 is an electronic device that is under control of a user (e.g., user 101) and is capable of sending/receiving requests (e.g., content item request 102) and resources/data (e.g., user preference data, user device identifiers, session identifiers, layout data, content items, transaction history) over communication network 120. Example user device 110 include personal computers (e.g., desktop or laptop), mobile communication devices (e.g., smartphones or tablets), video game console, servers, and other devices that can send and receive data over communication network 120. User device 110 includes (or executes) an banking client application (e.g., banking client application 270 in FIG. 2B), such as an internet/web browser, a graphic user interface (GUI), an email reader/client, and a File Transfer Protocol (FTP) client, or a banking client application independent from an internet/web browser), to facilitate the sending and receiving of data between user device 110 and content provider 140, via communication network 120. User device 110 renders the data within/via the banking client application or may include (or execute) other content rendering applications (e.g., pdf viewer, doc viewer, txt viewer, xls viewer, ppt viewer, HTML viewer, jpg/bmp/png viewer, video viewer) to display the received data on a display screen.

User device 110 connects to the content provider 140 (e.g., a content provider computing system 242 of FIG. 2) via a communication network 120. The communication network 120 is any suitable Local Area Network (LAN) or Wide Area Network (WAN). For example, the communication network 120 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The communication network 120 is structured to permit the exchange of data, values, instructions, messages, and the like between the user device 110 and the content provider 140 (e.g., a content provider computing system 242 of FIG. 2). Although not illustrated, in many implementations, communication network 120 may comprise one or more intermediary devices, including gateways, routers, firewalls, switches, network accelerators, Wi-Fi access points or hotspots, or other devices.

The user device 110 may be configured to send a content item request 102 to content provider computing system 242 to request an item (e.g., a content item) of content item data. For example, user device 110 may request a content item of, e.g., one or more accounts associated/managed by content provider 140 that are within a date range, matching a transaction category type (e.g., utility transactions, credit card transactions, direct deposit transactions, etc.), or the like. In some arrangements, the content item request 102 may include details regarding the request (e.g., name of the content provider or account holder, account number, accounting routing number, a user's 101 personal identifiable information), user preference data associated with user 101 and/or user device 110, and user device identifiers and session identifiers associated with user device 110. In some arrangements, user device 110 may be configured to receive requests to deliver any information including device identifiers, session identifiers, and any other user preference data collected by collection agent 215 and collection agent 217 to one or more computing devices, such as content provider computing system 242.

In one arrangement, user device 110 may receive a request from content provider computing system 242 to deliver one or more items of user preference data (including device identifiers and session identifiers) associated with user device 110. In response to the request, collection agent 215 and/or collection agent 217 searches all software applications (e.g., cookies stored by banking client application 270 and mobile wallet client application 280, an operating system registry system, or any other application executing on user device 110) and hardware components (e.g., devices connected to network interface 206, devices connected to input/output circuit 205, cache areas of processor 203, and memory 204) of user device 110 for all user preference data.

In some arrangements, collection agent 215 and/or collection agent 217 may query banking client application 270 and/or mobile wallet client application 280 for new user preference data not yet stored on user device 110.

In some arrangements, collection agent 215 and/or collection agent 217 may parse content displayed on user device 110 to record user preference data. For example, a browser executing on user device 110 may render an HTML file. Collection agent 215 and/or collection agent 217 may parse the HTML code into tokens by using delimiters. Collection agent 215 and/or collection agent 217 may then identify the HTML tag for "bold text" (e.g., <b> and </b>) indicating that the user enabled bold for all or portions of the displayed content. Collection agent 215 and/or collection agent 217 may generate user preference data bases on the identified tags. Example delimiters include commas (,), semicolon (;), quotes (","), braces ({ }), pipes (|), slashes (^), a space ( ) a hash sign (#), any single character (a-z), or any alphanumeric character string (e.g., b8).

In some arrangements, collection agent 215 and/or collection agent 217 may send a request to banking client application 270 and/or mobile wallet client application 280 prompting the user 101 of user device 110 with a pop-up window requesting additional user information. The user 101 of user device 110 may respond by entering the requested information in the pop-up window to make available to collection agent 215 and/or collection agent 217 for user preference data gathering. The user device 110 provides the one or more device identifiers, one or more session identifiers, and any user preference data to the content provider computing system 242 that made the request.

In some arrangements, user device 110 compresses (e.g., .bz2, .F, .gz, lz, .lzma, .lzo, .rz, .sfark, .sz, .xz, .z, .Z) all or any portion of the user preference data, device identifiers, and session identifiers prior to transmission to the content provider computing system 242 that made the request. In some implementations, user device 110 packages all or any portion of the user preference data, device identifiers, and session identifiers into an archive file (e.g., 0.7z, .apk, .bl, .ba, .cab, .cfs, .ear, .jar, .zip). In some implementations, user device 110 periodically transmits all or any portion of the user preference data, device identifiers, and session identifiers to content provider computing system 242 without the need to receive a request. In some arrangements, a request from one content provider 140 for user preference data, device identifiers, and/or session identifiers associated with user device 110 prompts user device 110 to send the requested data to all content provider computing systems 242 managed/controlled by the one content provider 140. In some arrangements, a request from one content provider 140 for user preference data, device identifiers, and/or session identifiers associated with user device 110 prompts user device 110 to send the requested data to each content provider within the same subset of content providers. For example, a request for data by a first content provider of subset A prompts user device 110 to send the requested data to the first content provider of subset A, as well as, a second content provider of subset A.

In some arrangements, content provider 140 may receive user preference data associated with user 101 that has been acquired/collected by one or more ATMs 112. For example, user 101 may conduct a transaction (e.g., withdrawal/deposit money, etc.) via ATM 112. During the transaction, user 101 may increase the font size of the text on the ATM display screen and increase the volume of the ATM speaker. ATM 112 may then assemble data indicative of these display changes into a collection of user preference data, and send this user preference data to a content provider 140. In some arrangements, ATM 112 may be one or more bank branches, loan offices, mortgage offices, brokerage offices, mortgage loan office, retail offices, automatic teller machine (ATM) locations, call center, combinations thereof, and/or the like.

FIG. 2A is a block diagram depicting an example user device 110 of the environment 100 in FIG. 1, according to some arrangements. FIG. 2B is a block diagram depicting an example content provider 140 of the environment 100 in FIG. 1, according to some arrangements. The content provider 140 may be one or more bank branches, loan offices, mortgage offices, brokerage office, mortgage/loan office, credit card company, retail offices, automatic teller machine (ATM) locations, combinations thereof, and/or the like. The content provider 140 has at least one associated content provider computing system 242.

The content provider 140 provides products and services such as, but not limited to, credit card accounts, mobile wallet, checking/saving accounts, retirement accounts, mortgage accounts, credit card services, loan accounts, investment and banking accounts, and the like to the user 101 via the content provider computing system 242. The content provider computing system 242 includes a processing circuit 243 composed of a processor 244 and a memory device 246. The processor 244 is implemented as a general-purpose processor, a microprocessor, an Application Specific Integrated Circuit (ASIC), one or more Field Programmable Gate Arrays (FPGAs), a Digital Signal Processor (DSP), a group of processing components, or other suitable electronic processing components. In many arrangements, processor 244 may be a multi-core processor or an array of processors. The memory 246 (e.g., Random Access Memory (RAM), Read-Only Memory (ROM), Non-volatile RAM (NVRAM), Flash Memory, hard disk storage, optical media, etc.) stores data and/or computer instructions/code for facilitating at least some of the various processes described herein. The memory 246 includes tangible, non-transient volatile memory, or non-volatile memory. The memory 246 stores programming logic (e.g., instructions/code) that, when executed by the processor 244, controls the operations of the content provider computing system 242. In some arrangements, the processor 244 and the memory 246 form various processing circuits described with respect to the content provider computing system 242 (e.g., a transaction indicator management circuit (not shown)). The instructions include code from any suitable computer programming language such as, but not limited to, C, C++, C#, Java, JavaScript, VBScript, Perl, HTML, XML, Python, TCL, and Basic. Content provider computing system 242 may include an input/output circuit (not shown) for. In some arrangements (referred to as headless servers), content provider computing system 242 may not include an input/output circuit, but may communicate with user device 110 with network interface 248 via communication network 120.

As shown, the content provider computing system 242 includes a network interface 248. The network interface 248 is structured for sending and receiving of data over the communication network 120 (e.g., to and from the user device 110, etc.). Accordingly, the network interface 248 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like. In many arrangements, content provider computing system 242 may include a plurality of network interfaces 248 of different types, allowing for connections to a variety of networks, such as local area networks or wide area networks including the Internet, via different sub-networks.

The content provider computing system 242 includes an account database 250 that stores customer information and account information relating to one or more accounts held by the user 101 with the content provider 140. In this regard, more than one content provider (such as, but not limited to, content provider 140) with an associated content provider computing system (such as, but not limited to, the content provider computing system 242) can be communicably coupled to the components of FIG. 2 over the communication network 120 to access the accounts held by the user 101. The account database 250 stores transaction history of transactions made by the user 101 using one or more accounts of the user 101, for example, with the banking client application 270, the mobile wallet client application 280, or with other suitable applications.

The content provider computing system 242 includes a mobile wallet account database 252 for storing mobile wallet accounts of users, including the user 101. The mobile wallet accounts permit payments via a mobile wallet client application 280 of the user device 110. The mobile wallet account database 252 stores transaction history of transactions made by the user 101 using the mobile wallet client application 280.

The content provider computing system 242 includes a template selector circuit 260. The template selector circuit 260 may be configured to select (and retrieve) one or more templates from template storage 150 based on a request for content (e.g., a content item request 102) received from a computing device (e.g., user device 110, any component of content provider computing system 242, or another content provider computing system 242 connected to communication network 120. That is, template selector circuit 260 may receive a content item request 102 from user device 110, and in response, search the template storage 150 for a template associated with user 101 and/or user device 110. The template selector circuit 260 may identify a "user template" in the template storage 150 that is associated with user 101 and/or user device 110 based on a comparison of any information in the template (e.g., elements, arrangement of the elements, element attributes, embedded scripts, metadata, metafile, etc.) to any "relevant information," including e.g., the content item request 102, user preference data, device identifiers, and/or session identifiers. In some arrangements, the template selector circuit 260 may identify a "user template" in the template storage 150 that is associated with user 101 and/or user device 110 based on content item data associated with user 101 and/or user device 110. In some arrangements, the user template associated with user 101 is not associated with any other user (or customer) having an account at content provider 140. In some arrangements, the user template associated with user device 101 is not associated with any other user device having a prior or current connection to a content provider computing system 242.

In some arrangements, template selector circuit 260 may extract elements and/or attributes associated with the elements of each template and compare each extracted element and/or attribute to such "relevant information" in order to determine if the template is associated with user 101 and/or user device 110. For example, template selector circuit 260 may extract an element value equal to "John Doe's Bill Summary" from a text-box element of a template. Template selector circuit 260 may then extract a user preference (e.g., "John Doe") from user preference data received from user device 110. Upon comparing the element value (e.g., "John Doe's Bill Summary") extracted from the template to the user preference (e.g., "John Doe") extracted from the user preference data, template selector circuit 260 may determine that the selected template is the "user template" associated with user 101 and/or user device 110. The attributes associated with a template may be stored within the template (e.g., metadata, HTML tags) and/or in a separate file (metafile) such as a script (e.g., Java applet, JavaScript, VBScript, TCL, Basic). In some arrangements, a template may include dynamic links to scripts that initialize/modify the attributes for the elements in that template. As such, template selector may fetch the script using the dynamic link and extract elements and/or attributes from the fetched script to facilitate the comparing of the template to the relevant information.

In some arrangements, template selector circuit 260 may compare each user template stored in template storage 150 to identify common arrangements of elements and element attributes to improve the default template for all users. For example, template selector circuit 260 may extract elements and/or attributes associated with the elements of each user template in template storage 150 and compare each extracted element and/or attribute of each user template to determine if a plurality of user 101 have common user preferences. Template selector circuit 260 may then generate and send a default-update message to template generator/updater circuit 262 to request an update to the "default template." The default-update message may include a list of the common user preferences (or a list of the common arrangement of elements and their respective element attributes) and the default template.

The template selector circuit 260 may compare two or more dataset using any pattern matching technique, including e.g., string comparison (exact match) and regular expression matching (near match). If template selector circuit 260 identifies more than one template in template storage 150 associated with user 101 and/or user device 110, then template selector circuit 260 assigns a score to each identified template to rank the relevance of each template. For example, template selector circuit 260 counts the number of extracted values that match (via a string comparison or regular expression) the "relevant information," and assigns that count value to the respective template. The template selector circuit 260 selects the matching template, or the template with the highest ranking score, and assigns the selected template as the "user template." Alternatively, if the template selector circuit 260 determines an absence of a user template associated with user 101 and/or user device 110 in template storage 150, then template selector circuit 260 selects a "default template." The default template sets a default or initial "look and feel" (e.g., font size, font color, screen resolution, zoom, scroll rate, etc.) for the presentation of content on a display screen. In some implementations, template selector circuit 260 may determine an absence of a "user template" and a "default template" in template storage 150, and in response, send a request to template generator/updater to generate a "default template." In some arrangements, template selector circuit 260 may perform a comparison of cryptographic data to improve processing time. For example, template selector circuit 260 may perform a cryptographic function on all or a portion of the user preference data to generate a first array of hash values. Template selector circuit 260 may perform the same cryptographic function on each element/attribute extracted from each template to generate a second array of hash values. Template selector circuit 260 may then compare each array element of the first array to each array element of the second array to identify a match. In response to the match, template selector circuit 260 may select (and retrieve) the identified "user template."

Template selector circuit 260 may be configured to generate, for each content item request 102 received, a notification message comprising the content item request 102 (including user preference data) and the one or more templates that template selector circuit 260 selected based on the respective content item request 102. Template selector circuit 260 may send the notification message to any circuit in content provider computing system 242 (e.g., template generator/updater circuit 262, content item data selector circuit 264, layout data generator circuit 266, and layout data delivery circuit 268, etc.) to indicate that a user 101 is requesting the delivery of a content item. In some arrangements, the notification message also includes the user preference data collected by one or more ATMs 112 in FIG. 1.

The content provider computing system 242 includes a template generator/updater circuit 262. The template generator/updater circuit 262 may be configured to generate one or more templates each having a set of elements and attributes assigned to each element for generating a content item. Template generator/updater circuit 262 stores the generated template in template storage 150. For example, template generator/updater 262 generates a "default template" for template selector circuit 260 to select when no "user template" associated with a particular user 101 and/or user device 110 exists in template storage 150. In some arrangements, template generator/updater 262 generates a "default template" prior to a first connection between user device 110 and content provider computing system 242. In some arrangements, template generator/updater 262 generates a "default template" in response to receiving a request from template selector circuit 260 to generate a "default template."

Template generator/updater circuit 262 generates a template by selecting one or more pre-created elements from a library of elements. The library of elements may be a widget toolkit (GUI toolkit) stored in a local storage location (e.g., template storage 150) or a remote storage location. Template generator/updater circuit 262 arranges the selected elements based on an initialization of the x-y coordinate attribute for each selected element. In some arrangements, an administrator of content provider 140 determines the "look and feel" of a default template for the content provider 140 by providing template generator/updater circuit 262 with a list of elements and the values (initialization) associated with each of the respective attributes. In response, template generator/updater circuit 262 builds and stores this "default template" in template storage 150.

Template generator/updater circuit 262 may be configured to modify (or update) a previously built template (e.g., a default template, a user template) in response to receipt of a notification message from template selector circuit 260. For example, template generator/updater circuit 262 may receive a notification message comprising user preference data associated with user 101 and/or user device 110 and the template that template selector circuit 260 selected from template storage 150 based on the user preference data. In response, template generator/updater circuit 262 updates/modifies, based on the user preference data, the selected template and stores the modified template in template storage 150 as a user template. Template generator/updater circuit 262 is configured to modify any portion of a template, including its elements, the arrangement of its elements, and/or the element attributes. For example, template generator/updater circuit 262 may receive user preference data (associated with user 101 and/or user device 110) from template selector circuit 260 indicating that user 101 changed the font size of content displayed on user device 110 from 12 point font to 16 point font. In response, template generator/updater circuit 262 may update the font-size attribute for some or all of the elements of the selected template, and store the updated template in template storage 150.

In some arrangements, template generator/updater circuit 262 may modify (or update) a previously built template (e.g., a default template, a user template) to account for different screen sizes of user device 110. For example, template generator/updater circuit 262 may receive user preference data indicating that a screen of the user device 110 is too small to display a content item without having to overlap the images and/or text of the content item. In response, template generator/updater circuit 262 may remove one or more elements from the template to avoid the overlapping condition. That is, template generator/updater circuit 262 corrected the overlapping condition by removing text and/or images from the content item.

In some arrangements, template generator/updater circuit 262 updates/modifies a default template stored in template storage 150, based on a plurality of user templates associated with a plurality of users of content provider 140. For example, template generator/updater circuit 262 may receive a default-update message from template selector circuit 260 requesting the update of the default template. In response, template generator/updater circuit 262 updates/modifies the default template based on the default-update message, and stores the modified default template in template storage 150 as the "default template."

The content provider computing system 242 includes a content item data selector circuit 264 configured to select all or a portion of content item data associated with user 101 and/or user device 110, and send the selected content item data (herein referred to as a "content item dataset") to the layout data generator circuit 266. Content item data selector circuit 264 may select a content item dataset in response to receipt of the notification from template selector circuit 260. Content item data selector circuit 264 may select a content item dataset based on any data associated with user device 110 and/or user device 110, including, e.g., content item request 102, user preference data, user device identifiers, session identifiers, customer information, account information, transaction history. For example, content item request 102 may indicate that user device 110 requests a content item containing transaction made between November 16 and November 30. Accordingly, content item data selector circuit 264 may generate a content item dataset by selecting, from content item data storage 152, all the content item data transactions made with user device 110 and occurring between November 16 and November 30.

The content provider computing system 242 includes a layout data generator circuit 266 configured to generate layout data (e.g., layout data 104) that may instruct (and cause) a computing device (e.g., user device 110) to assemble/render a content item in a default view (e.g., as stored in the "default template") or a user-preferred view (e.g., as stored in the "user template") on a display screen. For example, layout data generator circuit 266 receives a content item dataset from content item data selector circuit 264 and a notification message from template selector circuit 260. As discussed herein, the notification message comprises the content item request 102 (including user preference data) and the one or more templates that template selector circuit 260 selected based on the respective content item request 102. Layout data generator circuit 266 then generates the layout data by populating the selected template with all or portions of the content item dataset. For example, the selected template may include a list-box element reserved for the listing of content item data/transactions occurring between November 16 and November 30. Layout data generator circuit 266 may extract these content item data/transactions from the content item dataset and assign the extracted content item data/transaction to the element value associated with the list-box. Moreover, attributes assigned to the list-box element (as dictated by the template) then apply to the itemized transactions (e.g., bold, all caps). In some arrangements, layout data generator circuit 266 inserts the extracted content item data into the list-box element of the template. In some implementations, layout data generator circuit 266 generates the layout data 104 as an HTML file. In some implementations, layout data generator circuit 266 generates the layout data 104 as executable code that one or more processors of a computing device (e.g., content provider computing system 242, user device 110) may execute. In some implementations, layout data generator circuit 266 may generate scripts (or dynamic links to scripts) to include/insert into the layout data 104. The layout data 104 and/or the scripts may instruct user device 110 to display a content item (e.g., the content item identified in content item request 102) in the "look and feel" represented by the selected template.

In some arrangements, layout data 104 may instruct (and cause) a collection agent (e.g., collection agent 215, collection agent 217) of user device 110 to begin receiving/intercepting/reading/generating data, as described herein. In some arrangements, layout data 104 may instruct (and cause) any circuit of user device 110 to generate user preference data based on the data received/intercepted/read/generated by collection agent 215, collection agent 217, device ID circuit 207, and session ID circuit 208, as described herein.

The content provider computing system 242 includes a layout data delivery circuit 268 configured to receive layout data 104 from layout data generator circuit 266 and deliver the layout data to user device 110. In some arrangements, layout data delivery circuit 266 may receive a list containing pointers (or links) to multiple sets of layout data stored on a remote storage. As such, layout data delivery circuit 266 fetches each set of layout data via the link and delivers the fetched layout data to the user device 110.

Some or all of the circuits of content provider computing system 242 (e.g., processing circuit 243, template selector circuit 260, template generator/updater circuit 262, content item data selector circuit 264, layout data generator circuit 266, layout data delivery circuit 268) are coupled to network interface 248 for communicating with one or more of the user devices 110 or other content providers 140.

Some or all of the circuits of content provider computing system 242 (e.g., processing circuit 243, template selector circuit 260, template generator/updater circuit 262, content item data selector circuit 264, layout data generator circuit 266, layout data delivery circuit 268) are coupled to each of account database 250 and mobile wallet database 252 for reading/writing data to any of the databases.

In some arrangements, some or all of the circuits of content provider computing system 242 may be implemented with the processor 244. For example, template selector circuit 260, template generator/updater circuit 262, content item data selector circuit 264, layout data generator circuit 266, and/or layout data delivery circuit 268 may be implemented as a software application stored within the memory 246 and executed by the processor 244. Accordingly, such arrangement can be implemented with minimal or no additional hardware costs. In some arrangements, any of these above-recited circuits rely on dedicated hardware specifically configured for performing operations of the circuit.

As shown, the user 101 operates or is associated with the user device 110. In some arrangements, the user device 110 includes a processing circuit 202 having a processor 203 and memory 204. The processor 203 is implemented as a general-purpose processor, a microprocessor, an ASIC, one or more FPGAs, a DSP, a group of processing components that are distributed over various geographic locations or housed in a single location or device, or other suitable electronic processing components. The memory 204 (e.g., RAM, NVRAM, ROM, Flash Memory, hard disk storage, etc.) stores data and/or computer instructions/code for facilitating the various processes described herein. Moreover, the memory 204 is or includes tangible, non-transient volatile memory or non-volatile memory. Accordingly, the memory 204 includes database components, object code components, script components, or any other type of information structure for supporting the various activities and information structures described herein. The instructions include code from any suitable computer programming language such as, but not limited to, C, C++, C#, Java, JavaScript, VBScript, Perl, HTML, XML, Python, TCL, and Basic.

The user device 110 is shown to include various circuits and logic for implementing the activities described herein. More particularly, the user device 110 includes one or more of a processing circuit 202, input/output circuit 205, network interface 206, device ID circuit 207, session ID circuit 208, banking client application 270, mobile wallet client application 280, or the like. While various circuits, interfaces, and logic with particular functionality are shown, it should be understood that the user device 110 includes any number of circuits, interfaces, and logic for facilitating the functions described herein. For example, the activities of multiple circuits are combined as a single circuit and implemented on a same processing circuit (e.g., the processing circuit 202), as additional circuits with additional functionality are included.

The network interface 206 is configured for and structured to establish a communication session via the communication network 120 with the content provider computing system 242. Accordingly, the network interface 206 is an interface such as, but not limited to, the network interface 248.

The input/output circuit 205 is configured to receive user input from and provide information to the user 101. In this regard, the input/output circuit 205 is structured to exchange data, communications, instructions, etc. with an input/output component of the user device 110. Accordingly, input/output circuit 205 may be any electronic device that conveys data to a user 101 by generating sensory information (e.g., a visualization on a display, one or more sounds, tactile feedback, etc.) and/or converts received sensory information from a user 101 into electronic signals (e.g., a keyboard, a mouse, a pointing device, a touch screen display, a microphone, etc.). The one or more user interfaces may be internal to the housing of user device 110, such as a built-in display, touch screen, microphone, etc., or external to the housing of user device 110, such as a monitor connected to user device 110, a speaker connected to user device 110, etc., according to various arrangements. In some arrangements, the input/output circuit 205 includes communication circuitry for facilitating the exchange of data, values, messages, and the like between the input/output device and the components of the user device 110. In some arrangements, the input/output circuit 205 includes machine-readable media for facilitating the exchange of information between the input/output device and the components of the user device 110. In still another arrangement, the input/output circuit 205 includes any combination of hardware components (e.g., a touchscreen), communication circuitry, and machine-readable media.

The device identification circuit 207 (shown in FIG. 2A as device ID circuit 207) is configured to generate and/or manage a device identifier associated with user device 110. A device identifier may include any type and form of identification, including without limitation a Media Access Control (MAC) address, text and/or numerical data string, a username, a cryptographic public key, cookies, device serial numbers, user profile data, network addresses, or any other such identifier that may be used to distinguish the user device 110 from other user devices 110. In some implementations, a device identifier may be associated with one or more other device identifiers (e.g., a device identifier for a mobile device, a device identifier for a home computer, etc.). In many implementations, to preserve privacy, the device identifier may be cryptographically generated (via any hash function algorithm including, e.g., HMAC, SHA-1, SHA-2, SHA-3, MD2, MD4, and MD5), encrypted (e.g., via triple Data Encryption Standard (DES), RSA, blowfish, two-fish, or the Advanced Encryption Standard (AES)), or otherwise obfuscated by any circuit (e.g., processing circuit, device identification circuit 207, etc.) of user device 110.

The session identification circuit 208 (shown in FIG. 2A as session ID circuit 208) is configured to generate and/or manage a session identifier associated with communication sessions between user device 110 and any other node/entity (e.g., content provider computing system 242, other user devices 110, etc.) on communication network 120. A session identifier may be similar to a device identifier, but generated more frequently, such as hourly, daily, upon activation of banking client application 270 and/or mobile wallet client application 280, or any other such period. A session identifier may be generated by a session ID circuit 208 or received from any other node/entity on communication network 120. A session identifier may be used in place of device identifiers to increase anonymity, or may be used in connection with device identifiers to distinguish interactions of one session from those of another session. In many implementations, to preserve privacy, the session identifier may be cryptographically generated (via any hash function algorithm including, e.g., HMAC, SHA-1, SHA-2, SHA-3, MD2, MD4, and MD5), encrypted (e.g., via triple Data Encryption Standard (DES), RSA, blowfish, two-fish, or the Advanced Encryption Standard (AES)), or otherwise obfuscated by any circuit (e.g., processing circuit, session identification circuit 208, etc.) of user device 110.

One or more of the banking client application 270 or mobile wallet client application 280 are server-based applications executable on the user device 110. In this regard, the user 101 has to first download the application(s) prior to usage. In another arrangement, the banking client application 270 and/or mobile wallet client application 280 are coded into the memory 204 of the user device 110. In still another arrangement, the banking client application 270 and/or mobile wallet client application 280 are web-based interface applications. In this configuration, the user 101 has to log onto or otherwise access the web-based interface before usage. In this regard, at least one of the banking client application 270 and mobile wallet client application 280 is supported by a separate computing system comprising one or more servers, processors, network interface modules, etc. that transmit the applications for use to the user device 110.

In certain arrangements, one or more of the banking client application 270 and/or mobile wallet client application 280 include an Application Programming Interface (API) and/or a Software Development Kit (SDK) that facilitate integration of other applications. All such variations and combinations are intended to fall within the spirit and scope of the present disclosure.

The banking client application 270 is communicably coupled to the content provider computing system 242 (e.g., the account database 250) via the communication network 120 and is structured to permit management of at least one account of the user 101 via the banking client application 270. In this regard, the banking client application 270 provides displays indicative of account information such as, but not limited to, current account balances, pending transactions, profile information (e.g., contact information), reward associated with the account, bill pay information and/or the like. Further, in some arrangements, the banking client application 270 is configured to process payments from the user 101 to a designated recipient. For example, the banking client application 270 depicts a loan (e.g., mortgage) of the user 101 and allows the user 101 to pay the loan from an account (e.g., checking or savings). In some examples, a bill pay option is provided by the banking client application 270, where the bill pay option allows the user 101 to pay his/her bills in response to user input.

As mentioned herein, via the banking client application 270, the user 101 pays bills (e.g., mortgage, etc.), view balances, pays merchants, and otherwise manage their account. Accordingly and as shown, the mobile bank client application 270 includes an account information circuit 214. The account information circuit 214 is linked or otherwise coupled to one or more accounts (as stored in the account database 250) held by the user 101 and permit management of the associated accounts (e.g., transfer balances between accounts, view payment history, etc.) by communicating with the content provider computing system 242. The banking client application 270 is communicably coupled to the mobile wallet client application 280. As such, in response to a mobile payment via the mobile wallet client application 280, the mobile wallet client application 280 causes the banking client application 270 to update the payment account (i.e., the account that supported the mobile payment). As such, the applications 270 and 280 are communicably coupled to each other to enable actions supported by each respective application.

The banking client application 270 includes a collection agent 215. Collection agent 215 may include an application plug-in, application extension, subroutine, browser toolbar, daemon, or other executable logic for collecting data processed by banking client application 270 and/or monitoring interactions of user 101 with input/output circuit 205. In other arrangements, collection agent 215 may be a separate application, service, daemon, routine, or other executable logic separate from banking client application 270 but configured for intercepting and/or collecting data processed by banking client application 270, such as a screen scraper, packet interceptor, API hooking process, or other such application.

The collection agent 215 may be configured for intercepting or receiving data input (or commands to modify a software or hardware setting of a computing system) via input/output circuit 205, including mouse clicks, scroll wheel movements, gestures such as swipes, pinches, or touches, or any other such interactions; as well as data received and processed by banking client application 270 including enabling, disabling, and/or modifying features of banking client application 270 to alter the appearance of the content displayed on a screen (not shown) of user device 110 or an external screen (not shown) controlled by user device 110. For example, intercepted or received data may include data indicating the current setting or changes to the setting for language type (e.g., English, French, etc.), font size, font color, font effects (e.g., strikethrough, superscript, subscript, shadow, outline, emboss, engrave, small caps, large caps), font style (e.g., regular, italic, bold, underline), font type/theme (e.g., Times New Roman, Ariel, etc.), screen zoom, screen resolution, page layout, arrangement of rows and columns of content displayed in tabular format, sorting of transactions (e.g., chronological, alphabetical, largest/smallest monetary value), appearance of content displayed in a graphical format, horizontal/vertical scroll bar positioning/speed, application window size, viewing angle/mode, page layout (e.g., portrait, landscape, whole page mode, map mode), depth of field (DOF), focus range/effective focus range, screen width/height, or any other changes that alter the visual display of content.

In some arrangements, collection agent 215 may be configured to read the register/memory settings indicating the current setting for any feature associated with any software application executing on processor 203 (e.g., an operating system, banking client application 270, mobile wallet client application 280, an email client application, or any content rendering/viewing application as described herein), any hardware component housed within user device 110 (e.g., a graphics controller, display screen, etc.), and any external hardware component managed/operated by user device 110 (e.g., external display screen/projector, webcam, speaker, etc.). For example, collection agent 215 may determine that user device 110 is a mobile device based on reading the screen size from a register/memory setting of the graphics controller of user device 110.

In some arrangements, collection agent 215 may be configured to determine if user device 110 is configured to block the execution of computer code or scripts (e.g., Java, JavaScript, VBScript, flash, or the like) that alter the appearance of the displayed content. In some arrangements, collection agent 215 may be configured for intercepting or receiving via input/output circuit 205 the enabling, disabling, and/or modifying of features of a display screen or graphic user interface (GPU) of user device 110, such as contrast, resolution, brightness, color setting, refresh rate, zoom, and the like. In some arrangements, collection agent 215 may be configured for intercepting or receiving via input/output circuit 205 the enabling/disabling, and/or modifying of features of an operating system of user device 110, such as enabling speech recognition mode and/or audio narration mode (via accessibility controls), including adjusting the narration language, narration speed, narration volume/mute. In some arrangements, collection agent 215 may be configured for intercepting or receiving via input/output circuit 205 camera or webcam data indicative of the eye movement of user 101. For example, the camera or webcam data may indicate that the user spends a majority (e.g., more than a particular percentage of time as compared to the viewing time dedicated to other regions) of time viewing a region (e.g., upper left, upper center, upper right, bottom right, bottom center, bottom left, center left, center, center right) of the display screen. In some arrangements, the camera or webcam data may indicate that the user spends a minority (e.g., less than a particular percentage of time as compared to the viewing time dedicated to other regions) of time viewing a particular region. In some arrangements, collection agent 215 may be configured to determine the duration user 101 spends viewing the displayed content, which content provider computing system 242 may use to determine whether the subject matter of the displayed content or the layout of the displayed content positively or negatively affects the user's 101 online experience, including time required to conduct transactions (e.g., paying bills).

In some implementations, collection agent 215 (or collection agent 217, as discussed herein), may begin intercepting/gathering/receiving data input via its respective input/output circuit based on any triggering event, including, e.g., a power-up of user device 110, a launch of any software application executing on a processor of user device 110 (e.g., an operating system, banking client application 270, mobile wallet client application 280, an email client application, or any content rendering/viewing application as described herein), or the receipt of layout data (e.g., layout data 104) from a content provider computing system 242.

Any data received/intercepted/read/generated by collection agent 215 (or collection agent 217, as discussed herein), device identification circuit 207, and session identification circuit 208 may be shared between any circuit of user device 110. Any circuit of user device 110 may each assemble all or any portion of the shared data into a data collection referred to herein as "user preference data." In many implementations, to preserve privacy, the user preference data may be cryptographically generated (via any hash function algorithm including, e.g., HMAC, SHA-1, SHA-2, SHA-3, MD2, MD4, and MD5), encrypted, or otherwise obfuscated by any circuit (e.g., processing circuit 202, collection agent 215, collection agent 217, device identification circuit 207, session identification circuit 208, etc.) of user device 110. In some arrangements, any circuit of user device 110 may insert, pre-pend, append, or encode the user preference data to a content item request 102.

The mobile wallet client application 280 is communicably coupled to the content provider computing system 242 (e.g., the mobile wallet database 252) via the communication network 120 and is structured to facilitate purchases by the user 101 via the mobile wallet client application 280. Accordingly, the mobile wallet client application 280 is linked or otherwise connected with one or more accounts (as stored in the account database 250) of the user 101. In operation, when at a point-of-sale terminal, the user 101 initiates the mobile wallet client application 280 and provides a passcode (e.g., biometrics such as a thumbprint, a Personal Identification Number (PIN), a password, etc.) to authenticate the user 101 and select the source payment account desired (e.g., a checking account from a particular content provider that is linked to the mobile wallet client application 280). By way of communication with the payment terminal (e.g., via near field communication), the aforementioned payment information is provided to the POS terminal or the merchant (e.g., via NFC, via barcode presentment, etc.) and the payment is processed. Beneficially, carrying payment cards are avoided or reduced via the mobile wallet client application 280.

As mentioned herein, the mobile wallet client application 280 is structured to facilitate and permit payments by interfacing with an account held by the user 101 at the content provider 140. Accordingly, the mobile wallet client application 280 is communicably coupled via the network interface 206 over the communication network 120 to the content provider computing system 242. As shown, the mobile wallet client application 280 includes a payment processing circuit 216 structured to facilitate payments by the user 101 via the mobile wallet client application 280. For example, the payment processing circuit 216 enables a quick-pay capability with a merchant. In this regard, the payment processing circuit 216 includes or is communicably coupled with a communication device (e.g., a near-field communication chip) that facilitates the exchange of information between the mobile wallet client application 280 and a POS terminal.

The mobile wallet client application 280 includes a collection agent 217. The collection agent 217 is configured for intercepting or receiving data (herein referred to as "user preference data") input via input/output circuit 205, as well as data received and processed by mobile wallet client application 280. Collection agent 217 is a collection agent such as, but not limited to, the collection agent 215.

In some arrangements, all of the data intercepted and/or received by collection agent 215 and/or collection agent 217 may be referred to herein as "user preference data." In some arrangements, user preference data only refers to the data intercepted and/or received by collection agent 215, but explicitly excludes data intercepted and/or received by collection agent 217. In some arrangements, user preference data only refers to the data intercepted and/or received by collection agent 217, but explicitly excludes data intercepted and/or received by collection agent 215. In some arrangements, user preference data only refers to portions of the data intercepted and/or received by collection agent 215 and/or portions of the data intercepted and/or received by collection agent 217.

FIG. 3A is a block diagram depicting an example browser 300*a* displaying a default viewing layout of a content item, according to some arrangements. FIG. 3B is a block diagram depicting an example browser 300*b* displaying a user-preferred viewing layout of a content item, according to some arrangements. The browser 300*a*, 300*b* includes an input field 304*a*, 304*b* for a user 101 to type a uniform resource locator (URL) to establish a connection between user device 110 and content provider computing system 242. The browser 300*a*, 300*b* includes a browser window 309*a*, 309*b* for viewing an HTML document, such as a content item. The browser 300*a*, 300*b* includes an account selector 306*a*, 306*b* and time period selector 308*a*, 308*b* for requesting a content item of a selected account and occurring within a selected time period. The browser 300*a*, 300*b* also includes a PDF button 310*a*, 310*b* for sending a request to content provider computing system 242 to deliver a portable document format (PDF) version of the content item to user device 110. The browser 300*a*, 300*b* includes a vertical scroll bar 314*a*, 314*b* allowing user 101 to vertically scroll the content item displayed in browser window 309*a*, 309*b* and a horizontal scroll bar 316*a*, 316*b* allowing user 101 to horizontally scroll the content item displayed in browser window 309*a*, 309*b*. The browser 300*a*, 300*b* includes a browser settings area 318*a*, 318*b* for modifying the display characteristics of the content item displayed in browser window 309*a*, 309*b*. Some exemplary browser settings include a font size selector 320*a*, 320*b* for modifying the font size of the text displayed in browser window 309*a*, 309*b*; a zoom selector 322*a*, 322*b* for modifying the window zoom of the browser window 309*a*, 309*b*; a font type selector 324*a*, 324*b* for modifying the font type of the text displayed in the browser window 309*a*, 309*b*; and an orientation selector 326*a*, 326*b* for modifying the page orientation of the content displayed in the browser window 309*a*, 309*b*. While browser 300*a*, 300*b* illustrate controls for font size, window zoom, font type, and page orientation, one of ordinary skill in the art could appreciate that browser 300*a*, 300*b* could include controls to modify any display characteristic, as described herein.

Referring to FIG. 3A, user 101 establishes a connection between user device 110 and content provider computing system 242 to request delivery of a content item by entering "http://www.contentprovider140.com" into input field 304a. Upon connection, content provider computing system 242 generates and sends layout data 104 to browser 300a, causing browser 300a to display a content item in browser window 309a based on a default view. In some arrangements, the layout data further causes collection agent 215 and/or collection agent 217 to begin monitoring the user's interaction with the displayed content item and to generate user preference data (as described herein) based on the monitoring and gathering of data associated with user 101 and/or user device 110. As shown, the default view for the content item sets font size selector 320a to "12pt," zoom selector to "100%," font type selector 324a to "Arial," and Orientation 326a to "Portrait." Moreover, the default view sets the horizontal scroll bar 316a in the left-most position and the vertical scroll bar 314a in the up-most position. In this viewing configuration, the browser 300a displays columns 1-4 (having headings of: "Date," "Description," "Deposit/Credit," and "Withdrawal/Debts") of the content item in its browser window 309a.

However, user 101 may find that the default view does not provide an optimal viewing experience and may choose to change one or more browser settings 318a. For example, the user 101 may change the font size from "12pt" (font size 320a in FIG. 3A) to "16pt" (font size 320b in FIG. 3B), the time period from "2-weeks" (time period selector 308a in FIG. 3A) to "1-month" (time period selector 308b in FIG. 3B), and the horizontal scroll bar from the left-most position (horizontal scroll bar 316b in FIG. 3A) to the right-most position (horizontal scroll bar 316b in FIG. 3A). In this new viewing configuration, the browser 300a displays columns 2-5 (having headings of: "Description," "Deposit/Credit," "Withdrawal/Debts," and "Category") of the content item in its browser window 309a and with a 16-pt font size. Collection agent 215 and/or 217 then gathers and sends these adjusted browser settings back to content provider computing system 242 to be used to create/update a user template for delivering content to user 101 and/or user device 110. That is, a future request for a content item from user 101 and/or user device 110 will prompt content provider computing system 242 to generate layout data based on the user template instead of the default template. As such, the layout data causes user device 110 to display a content item in the format and view shown in FIG. 3B.

In some arrangements, browser 300a, 300b includes a bill payment options area 330a, 330b for seamless payment or dispute of one or more transactions displayed in browser window 309a, 309b. Bill payment options area 330a, 330b includes a transaction bin 336a, 336b for dragging one or more transactions displayed on browser window 309a, 309b into the transaction bin 336a, 336b. Bill payment options area 330a, 330b includes a pay now button 332a, 332b for paying the transactions dragged into the transaction bin 336a, 336b. Bill payment options area 330a, 330b also includes a dispute transactions button 334a, 334b for disputing one or more transactions dragged into the transaction bin 336a, 336b. For example, user 101 may want to dispute the "Airplane Ticket" transaction that occurred on "11/16/2017" (as shown in FIG. 3A). The user 101 may place the transaction into the transaction bin 336a by selecting and holding a mouse button over any portion of the transaction in browser window 309a, dragging the transaction to cover any portion of the transaction bin 336a icon, and releasing the mouse cursor to "drop" the transaction into the transaction bin 336a. Upon selecting the dispute transactions button 334a, a dispute message is transmitted from the user device 110 to the content provider computing system 242 to indicate that user 101 disputes the transaction placed into the transaction bin 336a. In response, content provider computing system 242 may modify the layout data to indicate that these transactions have been disputed by the user 101, and content provider computing system 242 may send the modified layout data to user device 110 causing user device 110 to display the modifications made to the content item. Example modifications to indicate a disputed transaction include, e.g., removal of the disputed transactions from the content item, placing an icon (e.g., check mark, 'x' mark, '!' mark, or any other symbol) next to the disputed transaction, highlighting the disputed transaction, or the like.

Conversely, the user 101 may want to seamlessly consent to and pay one or more transactions appearing on browser window 309a. For example, user 101 may drag a first bill for $325.67 from "Dr. Smith" (not shown in FIG. 3A) to the transaction bin 336a. The user 101 may then drag a second bill for $225.99 from "Mr. Jones, Esq." to the transaction bin 336a. Upon selecting the pay now button 332a, a payment message is transmitted from the user device 110 to the content provider computing system 242 to indicate that user 101 wants to pay the transactions placed in the transaction bin 336a. In response, content provider computing system 242 may generate a payment to send to the creditor shown on the transaction. In some arrangements, the content provider computing system 242 generates a paper check and sends the paper check in the mail system. In some arrangements, content provider computing system 242 generates and sends an electronic payment (e.g., wire, ACH, etc.) to the creditor. In some arrangements, the content provider computing system 242 modifies the layout data to indicate that these transactions have been paid. The content provider computing system 242 may then send the modified layout data to user device 110 causing user device 110 to display the modifications made to the content item. Example modifications to indicate payment of a transaction, include e.g., removal of the paid transaction from the content item, placing an icon (e.g., a '✓' check mark, a 'x' mark, a '!' exclamation mark, or any other symbol) next to the paid transaction, highlighting the paid transaction, or the like.

Figure 4A:
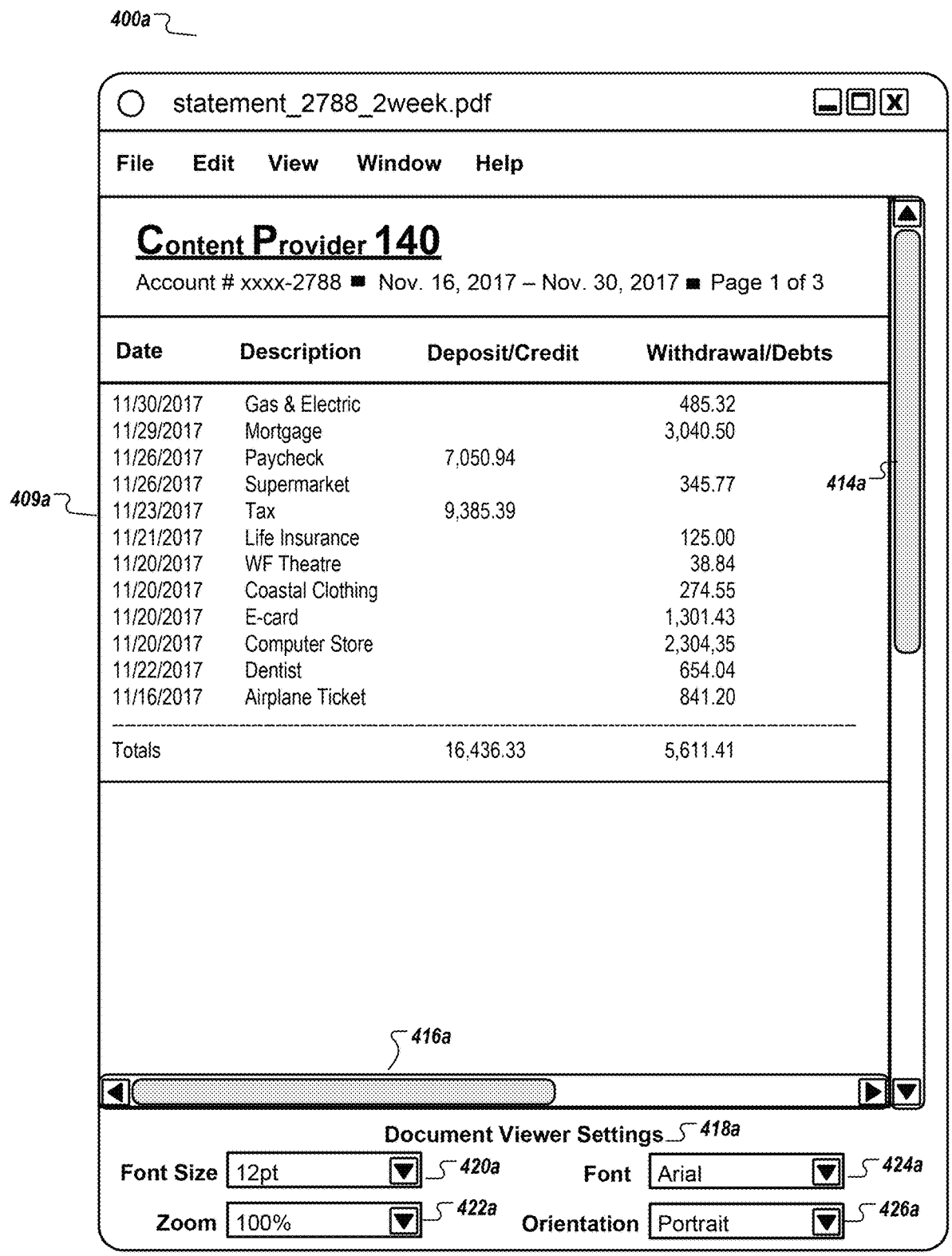
FIG. 4A is a block diagram depicting an example document viewer displaying a default viewing layout of a content item, according to some arrangements.
Figure 4B:
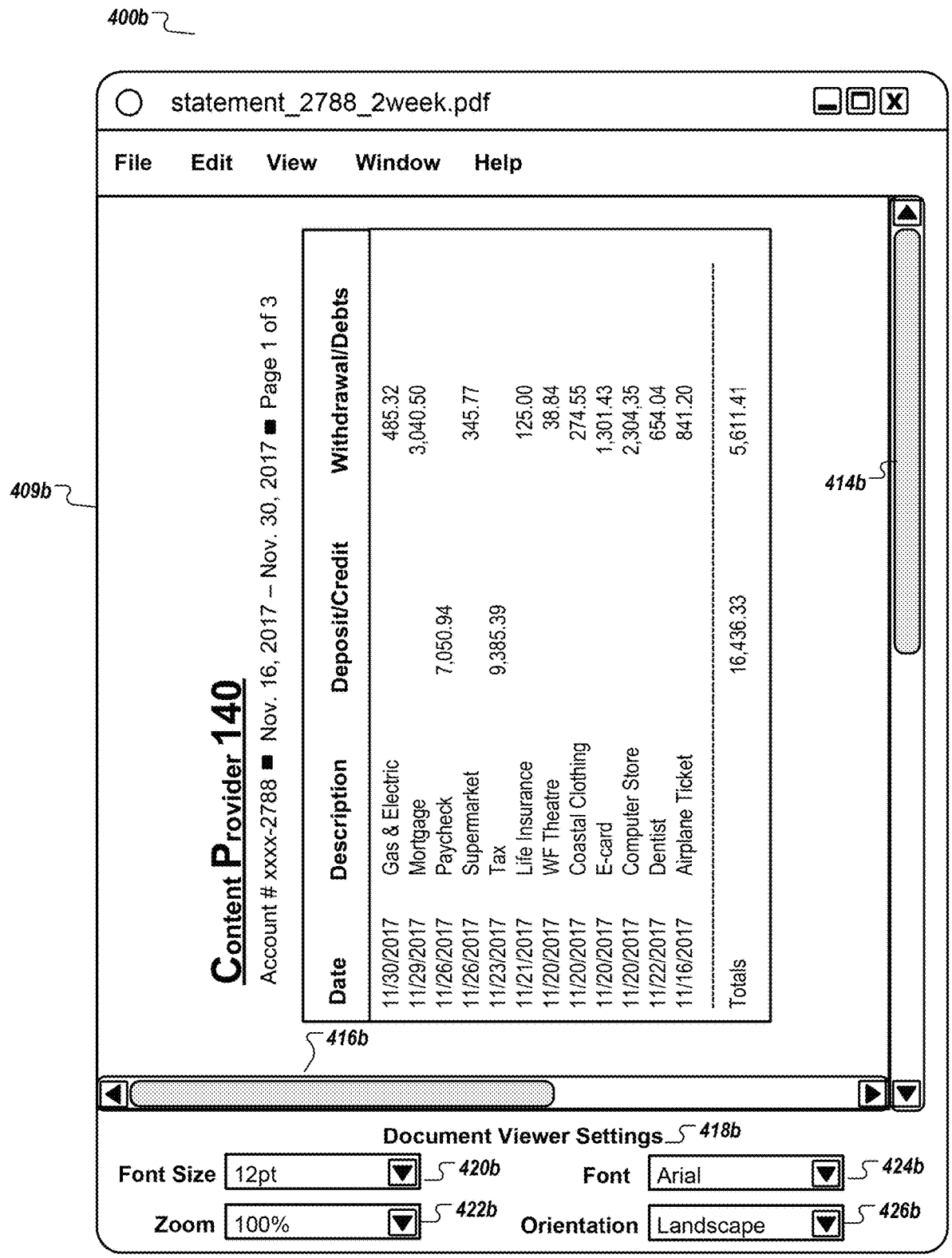
FIG. 4B is a block diagram depicting an example document viewer displaying a user-preferred viewing layout of a content item, according to some arrangements.

FIG. 4A is a block diagram depicting an example document viewer 400a displaying a default viewing layout of a content item, according to some arrangements. FIG. 4B is a block diagram depicting an example document viewer 400b displaying a user-preferred viewing layout of a content item, according to some arrangements. The document viewer 400a, 400b includes a viewer window 409a, 409b for viewing a PDF document, such as a content item delivered to user device 110 in response to user 101 selecting PDF button 310a in FIG. 3A. The document viewer 400a, 400b includes a vertical scroll bar 414a, 414b allowing user 101 to vertically scroll the content item displayed in document viewer window 409a, 409b and a horizontal scroll bar 416a, 416b allowing user 101 to horizontally scroll the content item displayed in document viewer window 409a, 409b. The document viewer 400a, 400b includes a document viewer settings area 418a, 418b for modifying the display characteristics of the content item displayed in document viewer window 409a, 409b. Some exemplary document viewer settings include a font size selector 420a, 420b for modifying the font size of the text displayed in document viewer window 409a, 409b; a zoom selector 422a, 422b for modifying the window zoom of the document viewer window 409a, 409b; a font type selector 424a, 424b for modifying the font type of the text displayed in the document viewer window 409a, 409b; and an orientation selector 426a, 426b for modifying the page orientation of the content displayed in the document viewer window 409a, 409b. While document viewer 400a, 400b illustrate controls for font size, window zoom, font type, and page orientation, one of ordinary skill in the art could appreciate that document viewer 400a, 400b could include controls to modify any display characteristic, as described herein.

As shown in FIG. 4A, the default view for the content item sets font size selector 420a to "12pt," zoom selector to "100%," font type selector 424a to "Arial," and orientation selector 426a to "Portrait." Moreover, the default view sets the horizontal scroll bar 416a in the left-most position and the vertical scroll bar 414a in the up-most position. In this viewing configuration, the document viewer 400a displays columns 1-4 (having headings of: "Date," "Description," "Deposit/Credit," and "Withdrawal/Debts") of the content item in its document viewer window 409a.

However, user 101 may choose to change one or more display settings in document viewer 400a to optimize the view of the displayed content item. For example, the user 101 may change the page orientation from "portrait" (orientation 426a in FIG. 4A) to "landscape" in FIG. 4B. In this new viewing configuration, the document viewer 400a displays the content item in its document viewer window 409a with a landscape page orientation. Collection agent 215 and/or 217 then gathers and sends these adjusted document viewer settings back to content provider computing system 242 to be used to create/update a user template for delivering content to user 101 and/or user device 110. That is, a future request for a content item from user 101 and/or user device 110 will prompt content provider computing system 242 to generate layout data based on the user template instead of the default template. As such, the layout data causes user device 110 to display a content item in the format and view shown in FIG. 4B. In some arrangements, content provider computing system 242 maintains a user template to generate layout data 104 for a browser 300a and a separate user template to generate layout data 104 for a document viewer 400. As such, changes made to the browser settings 318a in browser 300a causes content provider computing system 242 to update the user template for browser 300a, but not the user template for document viewer 400a. In some arrangements, content provider computing system 242 updates both templates when the user 101 makes a change to either the browser settings of browser 300a or document viewer settings of document viewer 400a.

FIG. 5 is a flow diagram depicting a method 500 for determining an optimal viewing layout of a content item on a computing device based on user preference data, according to some arrangements. In some arrangements, the method 500 may be performed by user device 110 and content provider computing system 242 in FIG. 2. In particular, user device 110 performs operations 502, 518, 520, 522, 524, 546, 548, 550, 552, 554, and 556, and content provider computing system 242 performs operations 504, 506, 508, 510, 512, 514, 516, 526, 528, 530, 532, 534, 536, 538, 540, 542, and 544. Each operation may be re-ordered, added, removed, or repeated.

As shown, the method 500 begins with operation 502, where the user device sends a request for a content item (e.g., content item request 102) associated to the user's account to the content provider computing system 242. At operation 504, the content provider computing system 242 receives the request for the content item from user device 110. At operation 506, the content provider computing system 242 determines whether a user template associated with user 101 and/or user device 110 exists in template storage 150. If the content provider computing system 242 determines that no user template exists, then content provider computing system 242 proceeds to operation 508 to select a default template. Otherwise, if the content provider computing system 242 determines that a user template exists, then content provider computing system 242 proceeds to operation 510 to select a user template. At operation 512, content provider computing system 242 selects a first content item dataset based on the content item. At operation 514, content provider computing system 242 generates layout data based on the first content item dataset and the selected template 514. At operation 516, content provider computing system 242 sends the layout data to user device 110 to effect (a) the display of the content item in a first view and (b) the gathering of preference data 516. In some arrangements, the layout data causes user device 110 to display the content item on a screen physically connected to user device 110. In some arrangements, the layout data causes user device 110 to display the content item on a screen external or remote to user device 110.

At operation 518, user device 110 receives the layout data 518 from content provider computing system 242. At operation 520, user device 110 displays the content item in the first view based on the layout data 520. At operation 522, user device 110 gathers preference data in response to user's 101 interaction with the display of the content item 522. At operation 524, user device 110 sends a request for a second content item, where the request includes the preference data 524.

At operation 526, content provider computing system 242 receives the request for the second content item. At operation 528, selects a second content item dataset based on the second content item. At operation 530, the content provider computing system 242 determines whether a user template associated with user 101 and/or user device 110 exists in template storage 150. If the content provider computing system 242 determines that no user template exists, then content provider computing system 242 proceeds to: (a) operation 532 to select the "default template," (b) operation 534 to update the default template based on the preference data, (c) operation 536 to store the updated template as a user template, and (d) operation 542 (described below). Otherwise, if the content provider computing system 242 determines that a user template exists, then content provider computing system 242 proceeds to (a) operation 538 to select a "user template," (b) operation 540 to update the user template based on the preference data, and operation 542 to generate new layout data based on the second content item dataset and the selected template. At operation 544, content provider computing system 242 sends the new layout data to user device 110 to effect (a) the display of the second content item in the second view and (b) the gathering of new preference data. In some arrangements, the new layout data causes user device 110 to display the second content item on a screen physically connected to user device 110. In some arrangements, the new layout data causes user device 110 to display the content item on a screen external or remote to user device 110.

At operation 546, user device 110 receives the new layout data from content provider computing system 242. At operation 548, user device 110 displays the second content item in the second view based on the new layout data. At operation 550, content provider computing system 242 gathers new preference data in response to the user's 101 interaction with the display of the second content item. At operation 552, user device 110 determines whether user 101 requests an additional content item. If the user device 110 determines that user 101 requested an additional content item, then user device 110 proceeds to operation 554. At operation 554, user device 110 proceeds to operation 502 to send a request for another content item to content provider computing system 242, where the request includes the new preference data. Otherwise, if the user device 110 determines that user 101 did not request an additional content item, then user device 110 proceeds to operation 556 to send the new preference data to content provider computing system 242.

At operation 558, content provider computing system 242 receives the new preference data from user device 110.

Figure 6:
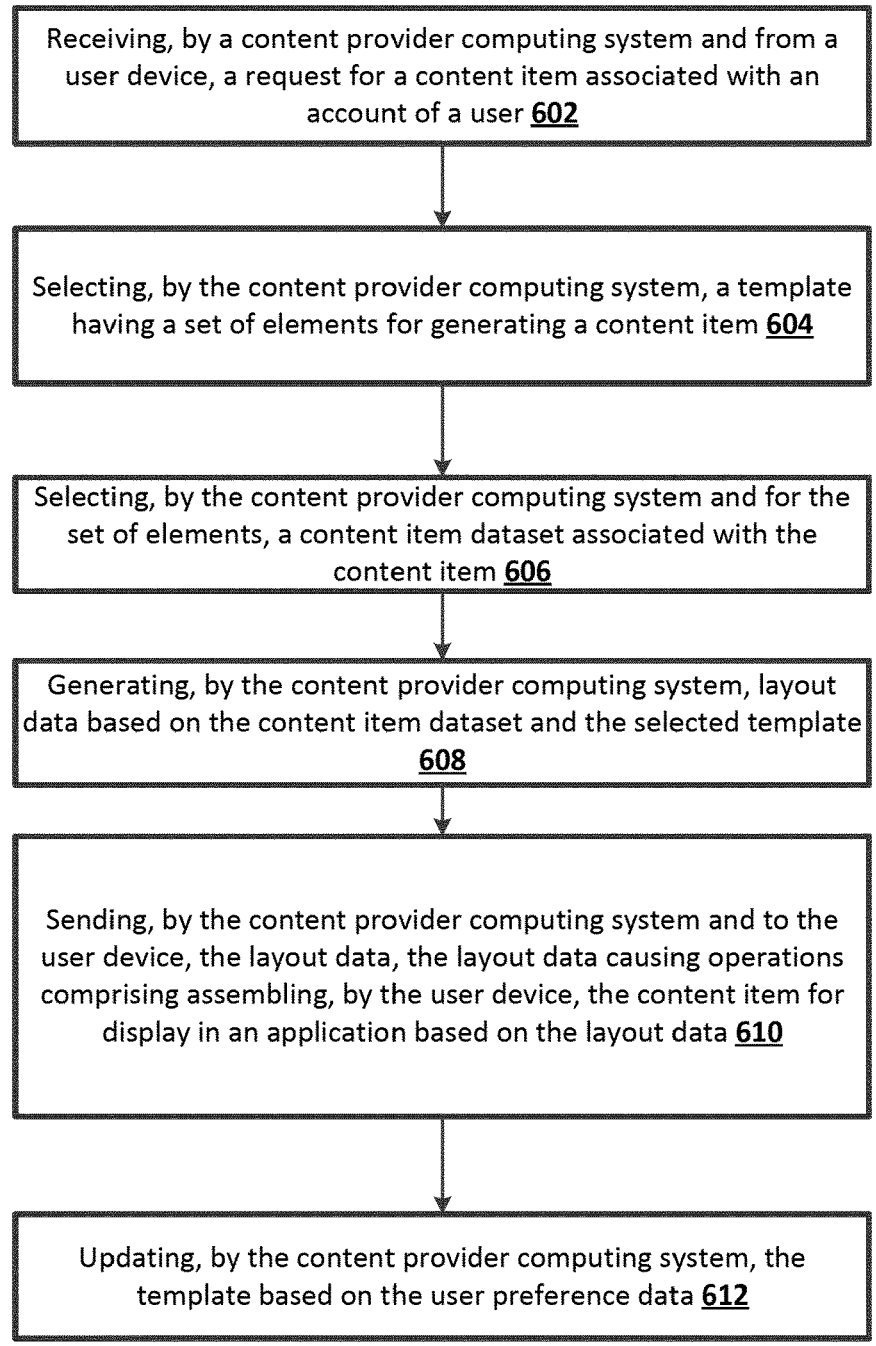
FIG. 6 is a flow diagram depicting a method for determining an optimal viewing layout of a content item on a computing device based on user preference data, according to some arrangements.

FIG. 6 is a flow diagram depicting a method 600 for determining an optimal viewing layout of a content item on a computing device based on user preference data, according to some arrangements. In some arrangements, the some or all operations of method 600 may be performed by a content provider computing system, such as content provider computing system 242 in FIG. 2. In some arrangements, some or all operations of method 600 may be performed by a user device, such as user device 110 in FIG. 2. Each operation may be re-ordered, added, removed, or repeated.

As shown, the method 600 begins with operation 602 where a content provider computing system performs an operation of receiving, from a user device, a request for a content item associated with an account of a user. At operation 604, the content provider computing system performs the operation of selecting a template having a set of elements for generating a content item. At operation 606, the content provider computing system performs the operation of selecting, for the set of elements, a content item dataset associated with the content item. At operation 608, the content provider computing system performs the operation of generating layout data based on the content item dataset and the selected template. At operation 610, the content provider computing system performs the operation of sending, to the user device, the layout data. The layout data causes operations comprising assembling, by the user device, the content item for display in an application based on the layout data, and gathering user preference data in response to an interaction of the user with the displayed content item. At operation 608, the content provider computing system performs the operation of updating the template based on the user preference data. At operation 612, the content provider computing system updates the template based on the user preference data.

Figure 7:
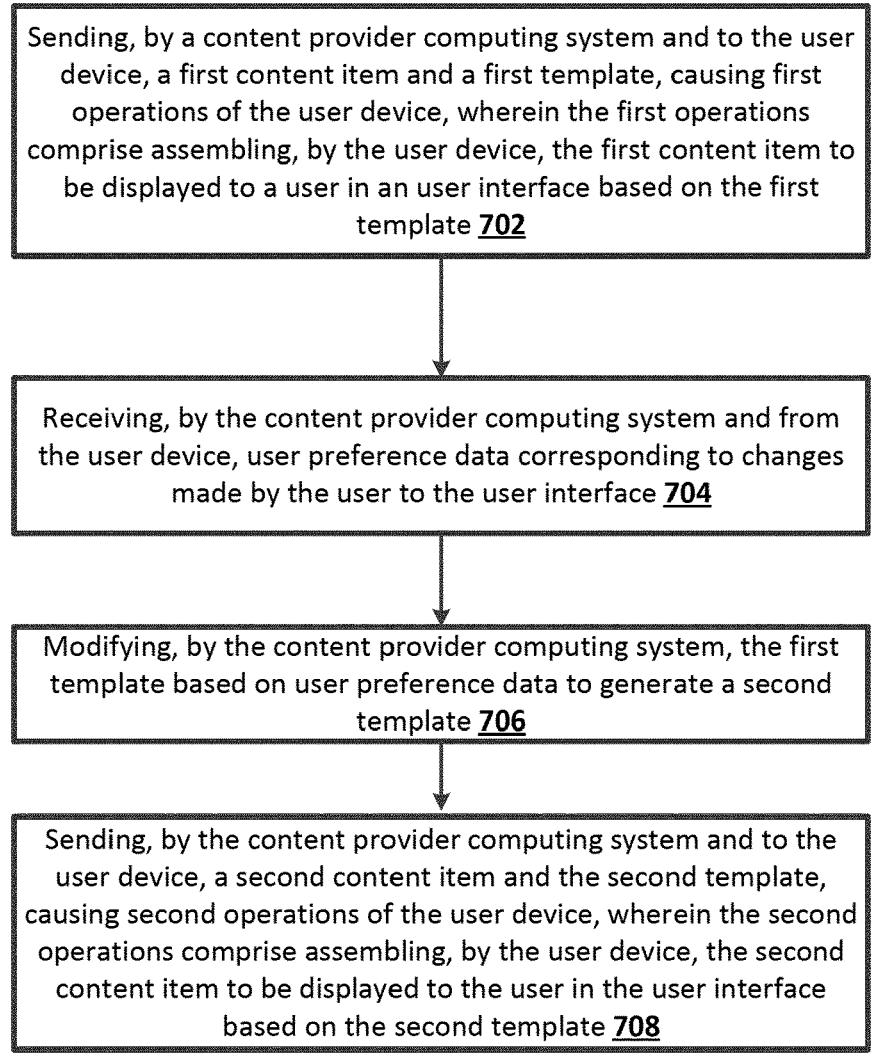
FIG. 7 is a flow diagram depicting a method for determining an optimal viewing layout of a content item on a computing device based on user preference data, according to some arrangements.

FIG. 7 is a flow diagram depicting a method 700 for determining an optimal viewing layout of a content item on a computing device based on user preference data, according to some arrangements. In some arrangements, the some or all operations of method 700 may be performed by a content provider computing system, such as content provider computing system 242 in FIG. 2. In some arrangements, some or all operations of method 700 may be performed by a user device, such as user device 110 in FIG. 2. Each operation may be re-ordered, added, removed, or repeated.

As shown, the method 700 begins with operation 702 where a content provider computing system performs an operation of sending, to the user device, a first content item and a first template, causing first operations of the user device, wherein the first operations comprise assembling, by the user device, the first content item to be displayed to a user in an user interface based on the first template. At operation 704, the content provider computing system performs the operation of receiving, from the user device, user preference data corresponding to changes made by the user to the user interface. At operation 706, the content provider computing system performs the operation of modifying the first template based on user preference data to generate a second template. At operation 708, the content provider computing system performs the operation of sending, to the user device, a second content item and the second template, causing second operations of the user device, wherein the second operations comprise assembling, by the user device, the second content item to be displayed to the user in the user interface based on the second template.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method comprising:

receiving, by a content provider computing system and from a user device, a request for a content item associated with an account of a user, wherein the request is received responsive to an interaction of the user via a banking client application associated with the content provider computing system that is executing on a processor of the user device and stored in memory on the user device;

selecting, by the content provider computing system from a template storage and based on the account of the user, a template having a set of elements;

generating, by the content provider computing system, a content item based on a set of elements includes in the template;

selecting, by the content provider computing and for the set of elements, a content item dataset associated with the content item;

generating, by the content provider computing system, layout data based on the content item dataset and the selected template, wherein the layout data comprises a plurality of regions comprising at least one of an upper left, upper center, upper right, bottom right, bottom center, bottom left, center left, center, or center right region of a display screen;

sending, by the content provider computing system and to the user device, the layout data, the layout data including computer-executable instructions configured to cause the user device to:

display, on the display screen of the user device, the content item via the banking client application based on the layout data;

receive, by the banking client application, an input of the user indicating an overlap event, the overlap event based at least in part on a size of the display screen;

regenerate, by the content provider computing system, the layout data based on the input of the user indicating an overlap event;

redisplay, on the display screen of the user device, the content item via the banking client application based on the regenerated layout data;

initiate, by a collection agent of the banking client application, intercepting based on a triggering event, wherein the triggering event is the regenerated layout data;

in response to initiating intercepting, intercept, via the banking client application by the collection agent from a camera, data indicative of an eye movement of the user;

determine, via the banking client application and based on the intercepted eye movement of the user, one region of the plurality of regions of the display screen where the user spends the majority of viewing time based on spending more than a particular percentage of viewing time in the one region of the plurality of regions as compared to the viewing time spent by the user on each of other regions of the plurality of regions;

generate, by the banking client application, user preference data indicating the determined one region of the plurality of regions of the display screen that the user spends a majority of the viewing time is above the particular percentage and the overlap event;

transmit, to the content provider computing system, the user preference data;

receiving, by the content provider computing system from the user device, the user preference data; and updating, by the content provider computing system responsive to receiving the user preference data, the template in the template storage based on the determined one region of the plurality of regions of the display screen that represents a majority of viewing time spent by the user and the overlap event.

2. The method of claim 1, wherein selecting the template further comprises:
determining, by the content provider computing system, an absence of a user template associated with the user in the template storage; and
selecting, by the content provider computing system from the template storage and in response to the determined absence, a default template having a set of elements, wherein the default template is associated with at least one other user of the content provider computing system.

3. The method of claim 2, wherein updating the template further comprises:
storing, by the content provider computing system and in the template storage, the updated default template as a template specific to the user.

4. The method of claim 1, further comprising:
receiving, by the content provider computing system and from the user device, a second request for the content item associated with the account of the user;
generating, by the content provider computing system, new layout data based on the content item dataset and the updated template; and
sending, by the content provider computing system, the new layout data to the user device, the new layout data including computer-executable instructions configured to cause the user device to display the content item according to the new layout data.

5. The method of claim 1, wherein selecting the template further comprises:
extracting, by the content provider computing system, an attribute from the template; and determining, by the content provider computing system, that the template is associated with the account of the user based at least in part on a comparison of the extracted attribute to information associated with the account of the user.

6. The method of claim 1, wherein the computer-executable instructions included in the layout data are further configured to cause the user device to:
intercept, via the banking client application, a command modifying a display setting of the banking client application, the display setting comprising at least one of a font size, a scroll bar position, and a language type.

7. The method of claim 1, wherein the computer-executable instructions included in the layout data are further configured to cause the user device to:
parse, via the banking client application, the displayed content item into one or more tokens based on one or more delimiters;
identify, via the banking client application, one or more tags indicative of a display setting, the one or more tags identified from the parsed one or more tokens; and
generate, via the banking client application, the user preference data based at least in part on the one or more identified tags.

8. A content provider computing system configured to:
receive, from a user device, a request for a content item associated with an account of a user, wherein the request is received responsive to an interaction of the user via a banking client application associated with the content provider computing system that is executing on a processor of the user device and stored in memory on the user device;
select, from a template storage and based on the account of the user, a template having a set of elements;
generate a content item based on the set of elements included in the template;
select, for the set of elements, a content item dataset associated with the content item;
generate layout data based on the content item dataset and the selected template, wherein the layout data comprises a plurality of regions comprising at least one of an upper left, upper center, upper right, bottom right, bottom center, bottom left, center left, center, or center right region of a display screen;
send, to the user device, the layout data including computer-executable instructions configured to cause the user device to:
display, on the display screen of the user device, the content item via the banking client application based on the layout data;
receive, by the banking client application, an input of the user indicating an overlap event, the overlap event based at least in part on a size of the display screen;
regenerate, by the content provider computing system, the layout data based on the input of the user indicating an overlap event;
redisplay, on the display screen of the user device, the content item via the banking client application based on the regenerated layout data;
initiate, by a collection agent of the banking client application, intercepting based on a triggering event, wherein the triggering event is the regenerated layout data;

in response to initiating intercepting, intercept, via the banking client application by the collection agent from a camera, data indicative of an eye movement of the user;

determine, via the banking client application and based on the intercepted eye movement of the user, a one region of the plurality of regions of the display screen where the user spends the majority of viewing time based on spending more than a particular percentage of viewing time in the one region of the plurality of regions as compared to the viewing time spent by the user on each of other regions of the plurality of regions;

generate, by the banking client application, user preference data indicating the determined one region of the plurality of regions of the display screen that the user spends a majority of the viewing time is above the particular percentage and the overlap event; and transmit, to the content provider computing system, the user preference data;

receive, by the content provider computing system from the user device, the user preference data; and update, responsive to receiving the user preference data, the template in the template storage based on the determined one region of the plurality of regions of the display screen that represents a majority of viewing time spent by the user and the overlap event.

9. The system of claim 8, wherein the content provider computing system is further configured to:

determine an absence of a user template associated with the user in the template storage; and select, from the template storage and in response to the determined absence, a default template having a set of elements, wherein the default template is associated with at least one other user of the content provider computing system.

10. The system of claim 9, wherein the content provider computing system is further configured to:

store, in the template storage, the updated default template as a template specific to the user.

11. The system of claim 8, wherein the content provider computing system is further configured to:

receive, from the user device, a second request for the content item associated with the account of the user;

generate new layout data based on the content item dataset and the updated template; and send the new layout data to the user device, the new layout data including computer-executable instructions configured to cause the user device to display the content item according to the new layout data.

12. The system of claim 8, wherein the content provider computing system is further configured to:

extract an attribute from the template; and determine that the template is associated with the account of the user based at least in part on a comparison of the extracted attribute to information associated with the account of the user.

13. The system of claim 8, wherein the computer-executable instructions included in the layout data are further configured to cause the user device to:

intercept, via the banking client application, a command modifying a display setting of the banking client application, the display setting comprising at least one of a font size, a scroll bar position, and a language type.

14. The system of claim 8, wherein the computer-executable instructions included in the layout data are further configured to cause the user device to:

parse, via the banking client application, the displayed content item into one or more tokens based on one or more delimiters;

identify, via the banking client application, one or more tags indicative of a display setting, the one or more tags identified from the parsed one or more tokens; and generate, via the banking client application, the user preference data based at least in part on the one or more identified tags.

15. A non-transitory computer readable medium having computer-executable instructions embodied therein that, when executed by at least one processor of a computing system, cause the computing system to perform various operations, the operations comprising:

receiving, from a user device, a request for a content item associated with an account of a user, wherein the request is received responsive to an interaction of the user via a banking client application associated with the computing system that is executing on a processor of the user device and stored in memory on the user device;

selecting, from a template storage and based on the account of a user, a template having a set of elements;

generating a content item based on the set of elements included in the template;

selecting, for the set of elements, a content item dataset associated with the content item;

generating layout data based on the content item dataset and the selected template, wherein the layout data comprises a plurality of regions comprising at least one of an upper left, upper center, upper right, bottom right, bottom center, bottom left, center left, center, or center right region of a display screen;

sending, to the user device, the layout data, the layout data including computer-executable instructions configured to cause the user device to:

display, on the display screen of the user device, the content item via the banking client application based on the layout data;

receive, by the banking client application, an input of the user indicating an overlap event, the overlap event based at least in part on a size of the display screen;

regenerate, by the content provider computing system, the layout data based on the input of the user indicating an overlap event;

redisplay, on the display screen of the user device, the content item via the banking client application based on the regenerated layout data;

initiate, by a collection agent of the banking client application, intercepting based on a triggering event, wherein the triggering event is the regenerated layout data;

in response to initiating intercepting, intercept, via the banking client application by the collection agent from a camera, data indicative of an eye movement of the user;

determine, via the banking client application and based on the intercepted eye movement of the user, a one region of the plurality of regions of the display screen a where the user spends the majority of viewing time based on spending more than a particular percentage of viewing time in the one region of the plurality of regions as compared to the viewing time spent by the user on each of other regions of the plurality of regions;

generate, by the banking client application, user preference data indicating the determined one region of the plurality of regions of the display screen that the user spends a majority of the viewing time is above the particular percentage and the overlap event; and transmit, to the computer system, the user preference data;

receiving, from the user device, the user preference data;

updating, responsive to receiving the user preference data, the template in the template storage based on the determined one region of the plurality of regions of the display screen that represents a majority of viewing time spent by the user and the overlap event.

16. A method of claim 1, wherein the triggering event is at least one of a power-up of the user device, a launch of the banking client application, or a receival of the layout data by the user device.

17. A method of claim 1, wherein initiating intercepting comprises initiating at least one of a screen scraper, a packet interceptor, or an application programming interface (API) process.

* * * * *